United States Patent
Bakaleinik et al.

(10) Patent No.: US 9,811,323 B2
(45) Date of Patent: Nov. 7, 2017

(54) METHODS, APPARATUS, SYSTEMS AND COMPUTER READABLE MEDIA FOR USE IN ASSOCIATION WITH PARTITIONING AND/OR RENDERING

(71) Applicants: Dmitry Bakaleinik, Kfar-Yona (IL); Daniel Turin, Kfar Saba (IL)

(72) Inventors: Dmitry Bakaleinik, Kfar-Yona (IL); Daniel Turin, Kfar Saba (IL)

(73) Assignee: SAP PORTALS ISRAEL LTD., Ra'anana (IL)

( * ) Notice: Subject to any disclaimer, the term of this patent is extended or adjusted under 35 U.S.C. 154(b) by 417 days.

(21) Appl. No.: 14/566,892

(22) Filed: Dec. 11, 2014

(65) Prior Publication Data

US 2016/0173570 A1    Jun. 16, 2016

(51) Int. Cl.
G06F 9/45        (2006.01)
G06F 9/54        (2006.01)
G06F 17/30       (2006.01)

(52) U.S. Cl.
CPC .............. *G06F 8/4441* (2013.01); *G06F 9/54* (2013.01); *G06F 17/30* (2013.01)

(58) Field of Classification Search
None
See application file for complete search history.

(56) References Cited

U.S. PATENT DOCUMENTS

2014/0143083 A1* 5/2014 Prathipati .......... H04L 41/5041
                                                        705/26.5
2015/0205887 A1* 7/2015 Freund .............. G06F 17/30867
                                                        707/722

* cited by examiner

*Primary Examiner* — Angela Nguyen
(74) *Attorney, Agent, or Firm* — Buckley, Maschoff & Talwalkar LLC

(57) ABSTRACT

In one embodiment, a method includes: receiving an application that includes a rendering portion; receiving code implementing a plurality of functions used by the application; defining a plurality of subsets of the plurality of functions, each of the plurality of subsets including at least one of the plurality of functions; monitoring which ones of the plurality of subsets has one or more of the at least one functions included therein invoked during execution of a portion of the application that includes the rendering portion; generating information indicating which ones of the plurality of subsets had one or more of the at least one functions included therein invoked during the execution of the portion of the application; and generating a first set of one or more files that includes: (i) code implementing ones of the plurality of functions that are included in or more of the plurality of subsets that had one or more of the at least one functions included therein invoked during execution of the portion of the application.

17 Claims, 28 Drawing Sheets

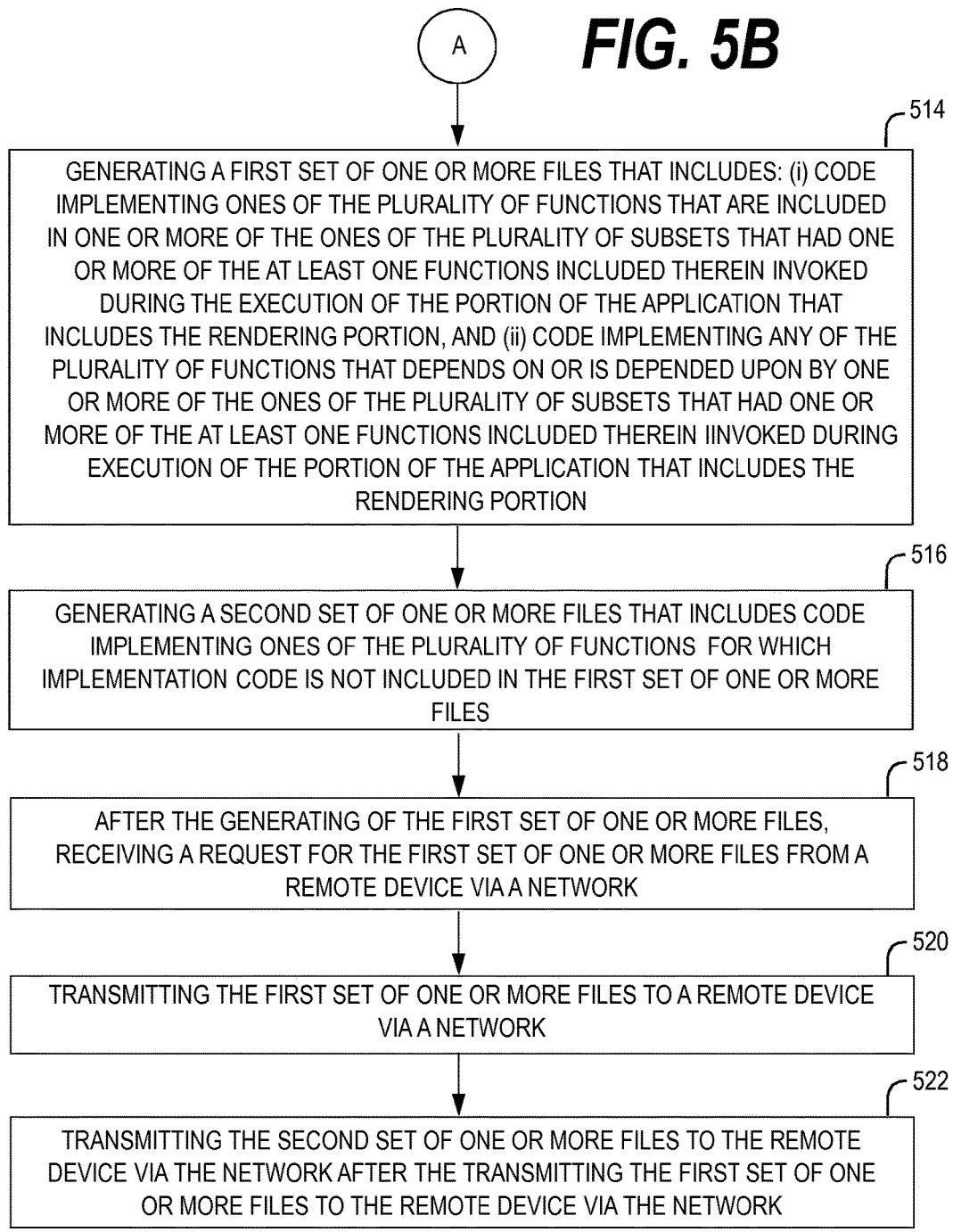

| SUBSET NAME | FUNCTIONS INCLUDED IN SUBSET |
|---|---|
| FUNCTION A | FUNCTION A |
| FUNCTION B | FUNCTION B |
| FUNCTION C | FUNCTION C |
| FUNCTION D | FUNCTION D |
| FUNCTION E | FUNCTION E |
| FUNCTION F | FUNCTION F |
| ... | ... |
| FUNCTION I | FUNCTION I |

*FIG. 6B*

| SUBSET NAME | FUNCTIONS INCLUDED IN SUBSET | INVOKED 1=YES 0=NO |
|---|---|---|
| FUNCTION A | FUNCTION A | 1 |
| FUNCTION B | FUNCTION B | 1 |
| FUNCTION C | FUNCTION C | 0 |
| FUNCTION D | FUNCTION D | 1 |
| FUNCTION E | FUNCTION E | 0 |
| FUNCTION F | FUNCTION F | 1 |
| ••• | ••• | |
| FUNCTION I | FUNCTION I | 0 |

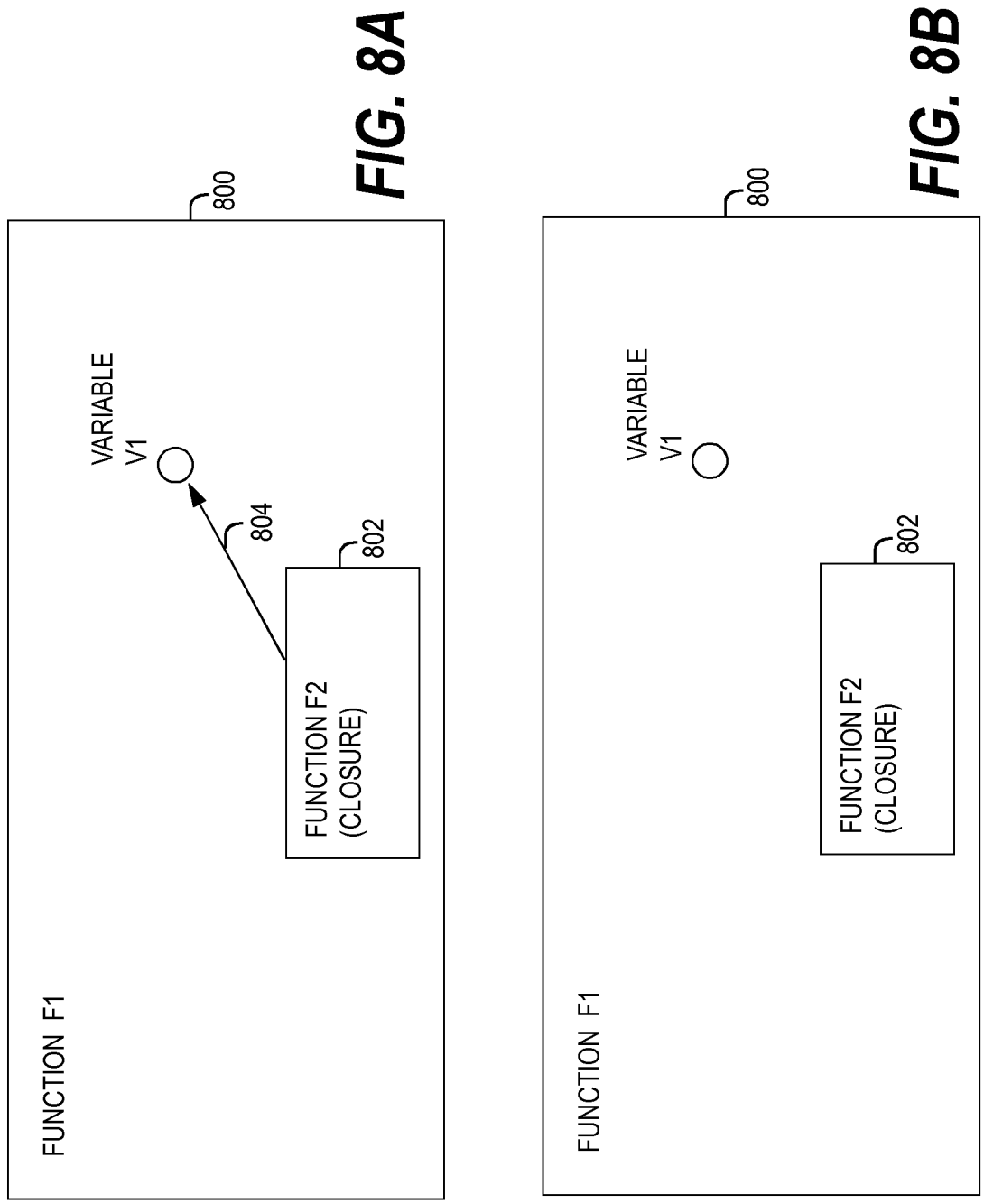

METHODS, APPARATUS, SYSTEMS AND COMPUTER READABLE MEDIA FOR USE IN ASSOCIATION WITH PARTITIONING AND/OR RENDERING

BACKGROUND

A user often uses a browser on a user device to navigate to a website or other application.

The website or other application will often include functions and variables that are downloadable to the user device in order to implement various features that are provided by the website or other application.

The features will often include providing information to, and receiving information from, the user via the user device. The information provided to the user will often include a view rendered on the user device. The information received from the user will often reflect audio and/or tactile input received by the user device. The rendering of the view and the receiving of the user input are often facilitated by the functions and variables downloaded from the website or other application to the user device.

BRIEF DESCRIPTION OF THE DRAWINGS

FIGS. 5A-5B are a flow chart of a method, in accordance with some embodiments.

FIG. 6B is a table showing a definition, in accordance with some embodiments.

FIG. 7A is a table showing a definition, in accordance with some embodiments.

FIG. 8A is a representation of an architecture, in accordance with some embodiments.

FIG. 8B is a representation of an architecture, in accordance with some embodiments.

DETAILED DESCRIPTION

A user's impression of a website or other application may be improved if the amount of time needed to generate an initial rendering of the website or other application is reduced.

As will be further described below, in accordance with some embodiments, the amount of time needed to generate an initial rendering of the website or other application is reduced by partitioning the functions used by the web site or other application into a plurality of files and downloading one or more of the files prior to downloading one or more others of the files.

In accordance with some embodiments, the downloading of one or more of the files prior to the downloading of the one or more others of the files has the effect of reducing the amount of time that is needed to generate the initial rendering of the website.

Methods, apparatus, systems and computer readable media for use in association with partitioning functions into a plurality of files and/or rendering are described below.

The above is not intended to be exhaustive and/or limiting. Other embodiments may be employed without departing from the scope of the invention as set forth in the appended claims.

Figure 1:
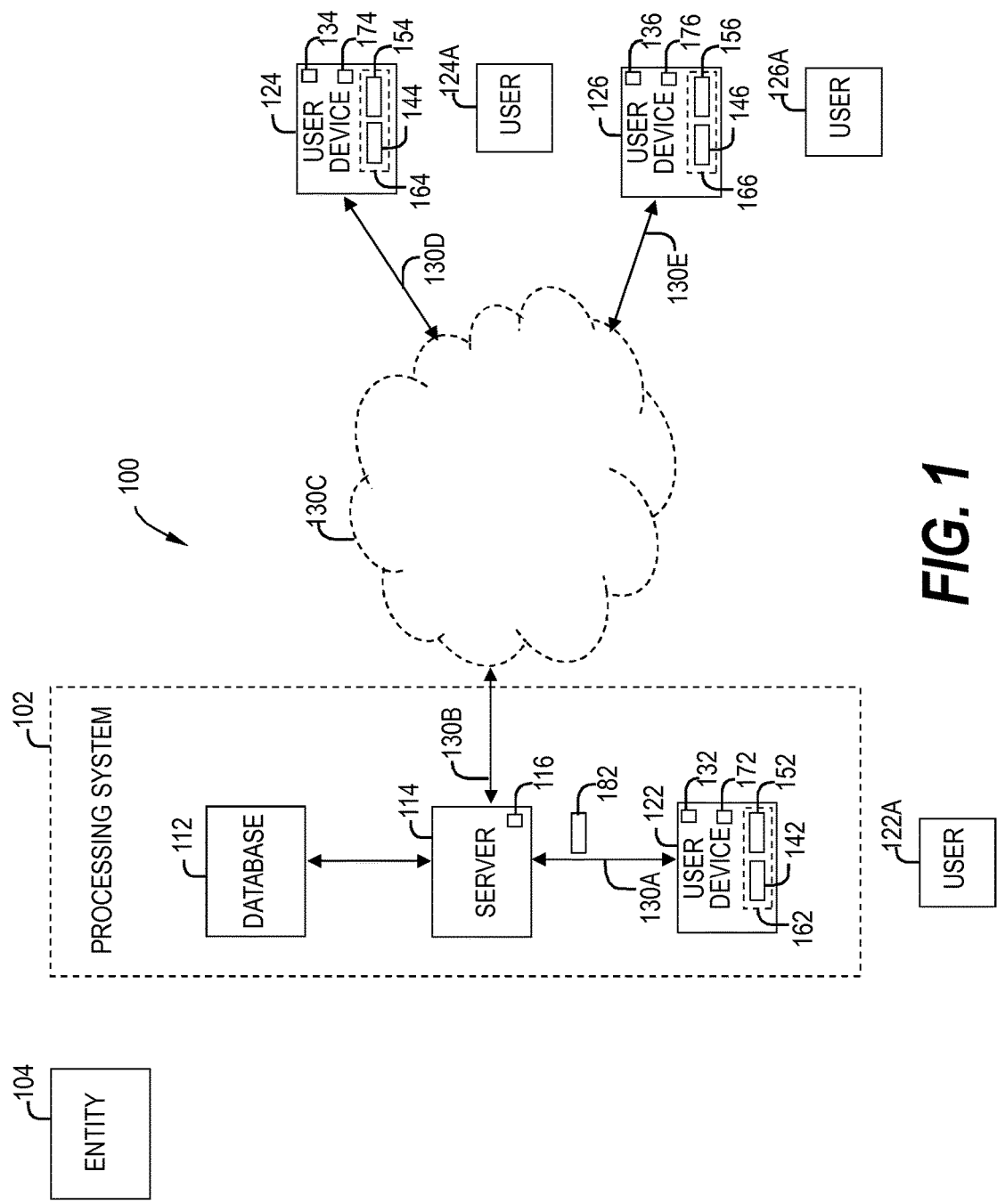
FIG. 1 is a block diagram of a system, in accordance with some embodiments.

FIG. 1 is a block diagram of a system 100, in accordance with some embodiments. Referring to FIG. 1, the system 100 includes a processing system 102 operated by, and/or on behalf of, an entity 104, e.g., a business. The processing system 102 may include a database 112 and a server 114. The database 112 may store information collected and/or used by the entity 104. The server 114, which may be coupled to the database 112 and may communicate therewith, may include one or more processors, e.g., processor 116. The one or more processors may perform one or more tasks. One or more of such processors may execute one or more programs to perform one or more of such tasks.

The system 100 (which is also a processing system) may further include a plurality of user devices, e.g., user devices 122-126, sometimes referred to herein as client devices and/or clients. The user devices, which may be operated by a plurality of users, e.g., 122A-126A, may be coupled to the server 114 via one or more communication links, e.g., communication links 130A-130E, which may define a network (or a portion thereof), e.g., a local area network and/or a wide area network, e.g., the Internet.

One or more of the user devices, e.g., user devices 124-126, may be located remote from the processing system 102 and may be referred to as remote devices. One or more of the user devices, e.g., user device 122, may comprise a desktop computer. One or more others of the user devices, e.g., user device 124 and/or user device 126, may comprise a laptop computer, a portable data assistant, a smart phone, and/or other type of user device.

Each of the user devices 122-126 may include one or more processors, e.g., processors 132-136, respectively, one or more input devices, e.g., input devices 142-146, respectively, and one or more output devices, e.g., display devices 152-156, respectively. The one or more processors, e.g., processors 132-136, may communicate with the input devices 142-146, respectively, and/or with the display devices 152-156, respectively, in order to provide user interfaces 162-166, respectively.

In some embodiments, the one or more processors, e.g., processors 132-136, execute one or more programs, e.g., 172-176, to perform one or more tasks. One or more of such programs may communicate with the server 114, directly and/or indirectly, to request information from and/or provide data to the server 114. In some embodiments, one or more of such programs is a browser program that communicates with server 114 to request information from and/or provide information to the server 114. In some embodiments, one or more portions of the information received from and/or provided to a user device may be stored in the database 112 of processing system 102.

In some embodiments, the server 114 comprises a local server. In some other embodiments, the server 114 comprises a web server or other remote server.

The server 114 may include one or more applications, each of which may include one or more programs that perform one or more operations. In some embodiments, one or more of the applications is associated with a website.

Figure 2:
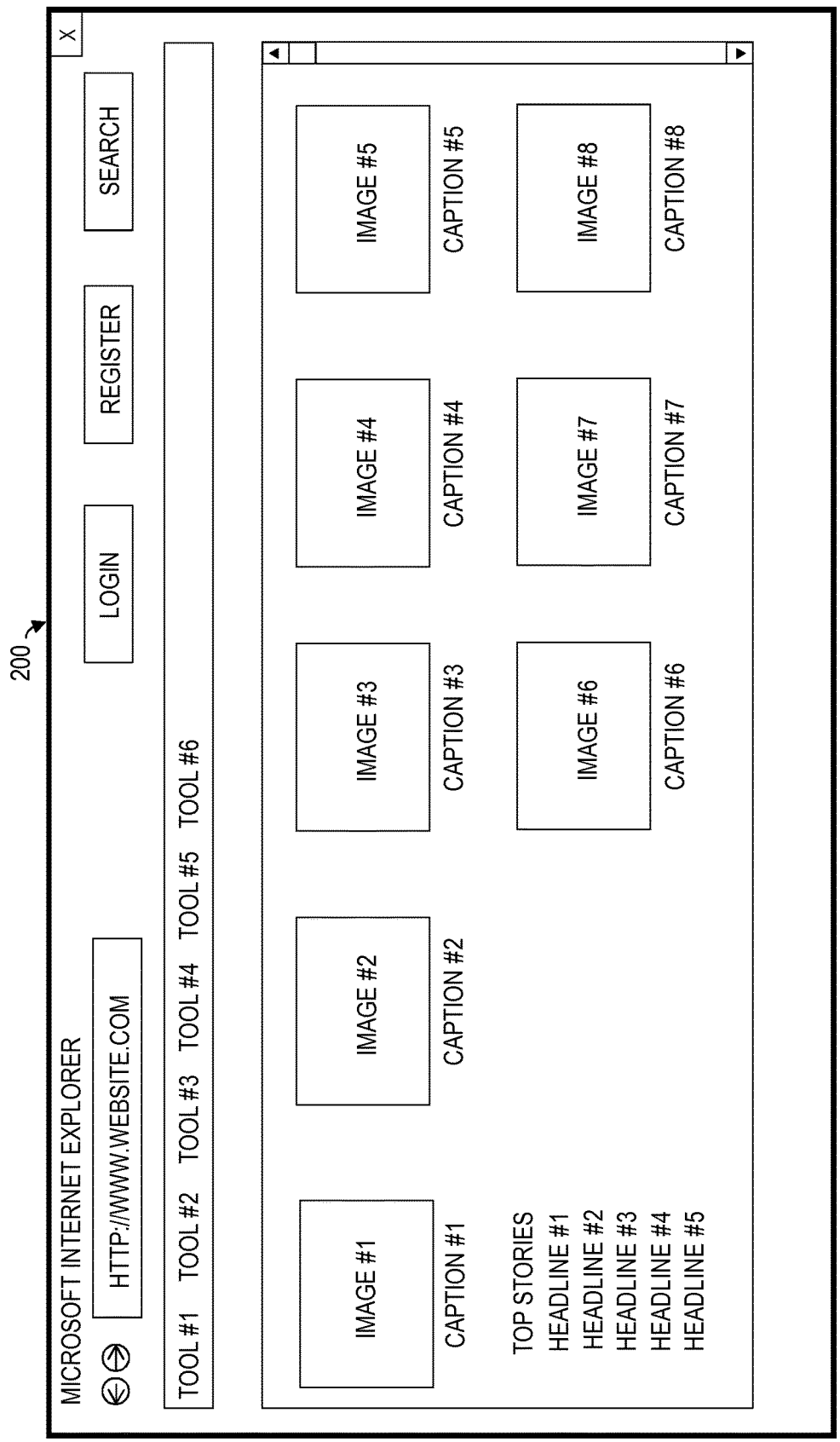
FIG. 2 is a representation of a view that may be rendered on a device, in accordance with some embodiments.

FIG. 2 is a representation of a view 200 that may be rendered on a device as a result of executing an application provided by the server, in accordance with some embodiments.

In some embodiments, the application may be executed as a result of a user typing or otherwise entering a uniform resource locator (URL) or web address associated with a web page of a website, e.g., www.website.com, into an address bar provided by a web browser and/or otherwise navigating to the web address associated with the web page of the website.

Referring to FIG. 2, in accordance with some embodiments, the view 200 may include a plurality of images, e.g., images labelled IMAGE#1-IMAGE#8, a plurality of text elements, e.g., text elements labeled CAPTION#1-CAPTION#8, TOP STORIES, HEADLINE#1-HEADLINE#5, a plurality of user controls, e.g., user controls labeled TOOL#1-TOOL#5, LOGIN, REGISTER, SEARCH, a user control shown as an address bar for typing or otherwise entering a URL or web address associated with the web page of a website, a user control shown as a back arrow (←) to return to a web address that was navigated to prior to navigating to the web address shown in the view 200, a user control shown as a forward arrow (→) to return to a web address that was navigated to after navigating to the web address shown in the view 200, a user control shown as an "X" to terminate the browser session and close the browser window, and a user control shown as an scroll bar to control which part of a web page is displayed.

In some embodiments, the plurality of images, e.g., images labelled IMAGE#1-IMAGE#8, and the plurality of text elements, e.g., text elements labeled CAPTION#1-CAPTION#8, TOP STORIES, HEADLINE#1-HEADLINE#5, may also be user controls that are selectable by a user to navigate to a web page or portion thereof.

After the view 200 is rendered on the device, the application may wait for user input, e.g., user input via one of the user controls. A first view, e.g., view 200, or other rendering, that is associated with a web page and followed by a wait for user input is sometimes referred to herein as an initial rendering.

Figure 3A:
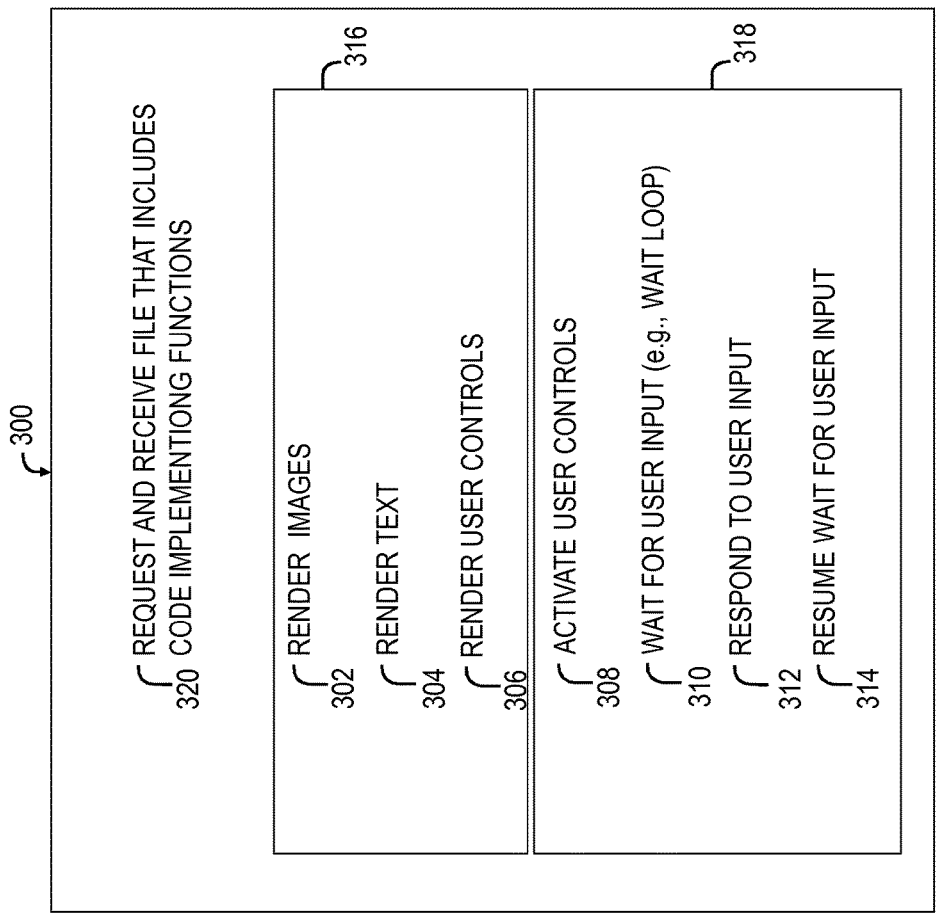
FIG. 3A is a representation of a portion of an application, in accordance with some embodiments.

FIG. 3A is a representation of a portion of the application that may be provided (e.g., by the server) to, and executed by, the device, in accordance with some embodiments.

Referring to FIG. 3A, in accordance with some embodiments, the portion of the application 300 includes a portion associated with rendering images 302, a portion associated with rendering text 304, a portion associated with rendering user controls 306, a portion associated with activating user controls 308, a portion associated with waiting for user input (e.g., a wait loop) 310, a portion associated with responding to user input 312 and a portion associated with resuming the wait for user input 314.

The portion associated with rendering images 302 is associated with rendering one, some or all of the images in a view or other rendering (e.g., images IMAGE#1-IMAGE#8 in FIG. 2). The portion associated with rendering text 304 is associated with rendering one, some or all of the text elements in a view or other rendering (e.g., CAPTION#1-CAPTION#8, TOP STORIES, HEADLINE#1-HEADLINE#5 in FIG. 2). The portion associated with rendering user controls 306 is associated with rendering one, some or all of the user controls in a view or other rendering (e.g., user controls TOOL#1-TOOL#5, LOGIN, REGISTER, SEARCH and other user controls in FIG. 2). The portion associated with activating user controls 308 is associated with activating one, some or all of the user controls in a view or other (e.g., user controls TOOL#1-TOOL#5, LOGIN, REGISTER, SEARCH and other user controls in FIG. 2). The portion associated with waiting for user input 310 waits for user input and may have an event driven architecture. The portion associated with responding to user input 312 is associated with responding to user input. The portion associated with resuming the wait for user input 314 may return control to the wait loop.

The portion associated with rendering images 302, the portion associated with rendering text 304 and the portion associated with rendering user controls 306 are sometimes each referred to herein as a rendering portion, and sometimes collectively referred to herein as rendering portion 320.

The portion associated with activating user controls 308, the portion associated with waiting for user input (e.g., a wait loop) 310, the portion associated with responding to user input 312 and the portion associated with resuming the wait for user input 314 are sometimes each referred to herein as a functionality portion, and sometimes collectively referred to herein as functionality portion 318.

Figure 3B:
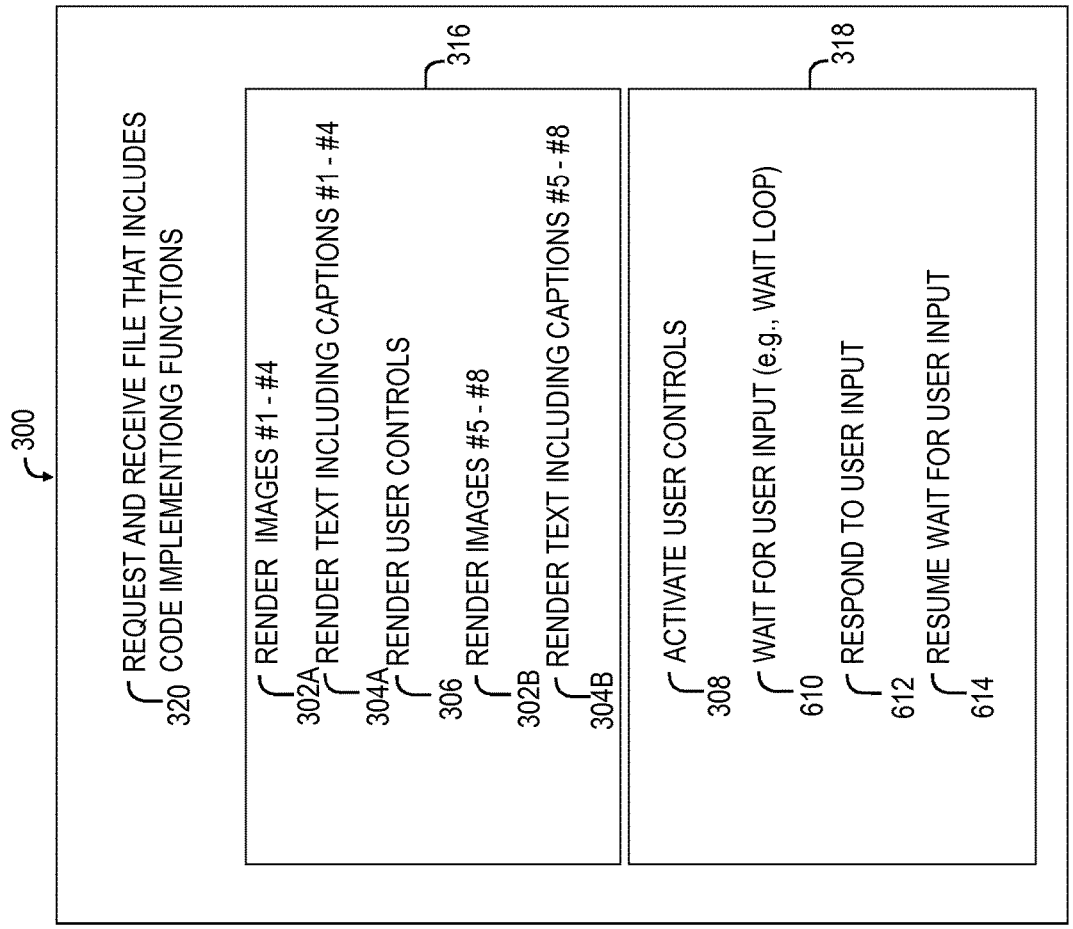
FIG. 3B is a representation of a portion of an application, in accordance with some embodiments.
Figure 3C:
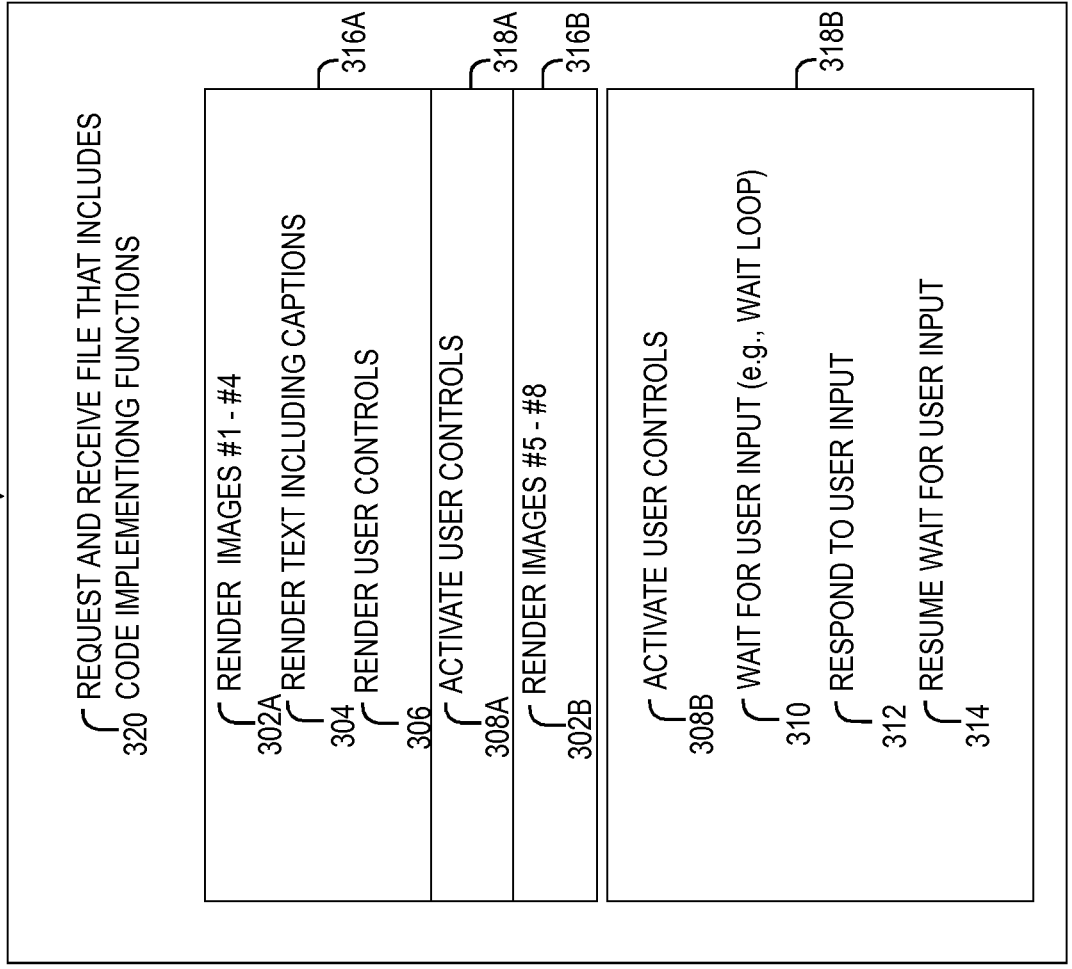
FIG. 3C is a representation of a portion of an application, in accordance with some embodiments.

One or more of the rendering portions (or portions thereof) may be interspersed with one another and/or with one or more portions of the functionality portions (or portions thereof). FIG. 3B is a representation of a portion of an application 300 in which portions associated with rendering images 302A-302B, portions associated with rendering text 304A-304B and the portion associated with rendering user controls 306 are interspersed with one another. FIG. 3C is a representation of a portion of an application 600 in which rendering portions 316A-316B are interspersed with functionality portions 318A-318B.

In accordance with some embodiments, the portion of the application 300 requires a plurality of functions in order to perform one or more of the operations associated therewith. In some embodiments, code implementing the plurality of functions may be available from a server, e.g., server 114. Thus, the application 300 may further include a portion associated with requesting and downloading (or otherwise receiving) a file that includes code implementing the plurality of functions 320.

Figure 4A:
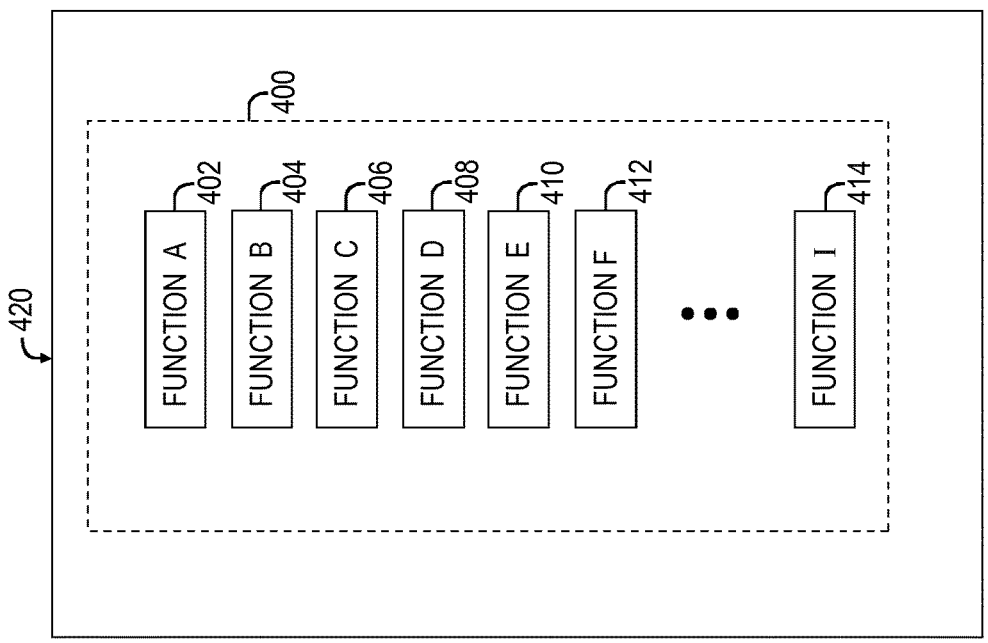
FIG. 4A is a representation of code implementing a plurality of functions, in accordance with some embodiments.

FIG. 4A is a representation of code implementing a plurality of functions, in accordance with some embodiments.

Referring to FIG. 4A, in accordance with some embodiments, the code 400 may include code implementing a first function 402, e.g., FUNCTION A, code implementing a second function 404, e.g., FUNCTION B, code implementing a third function 406, e.g., FUNCTION C, code implementing a fourth function 408, e.g., FUNCTION D, code implementing a fifth function 410, e.g., FUNCTION E, code implementing a sixth function 412, e.g., FUNCTION F, and code implementing an $i^{th}$ function 414, e.g., FUNCTION I.

In accordance with some embodiments, the code implementing the plurality of functions is stored in and/or received from a resource file 420, sometimes referred to herein as a master resource file.

In accordance with some embodiments, code implementing a function includes a function signature or other declaration (e.g., FUNCTION XYZ) and code that follows the signature or other declaration and implements the function.

Figure 4B:
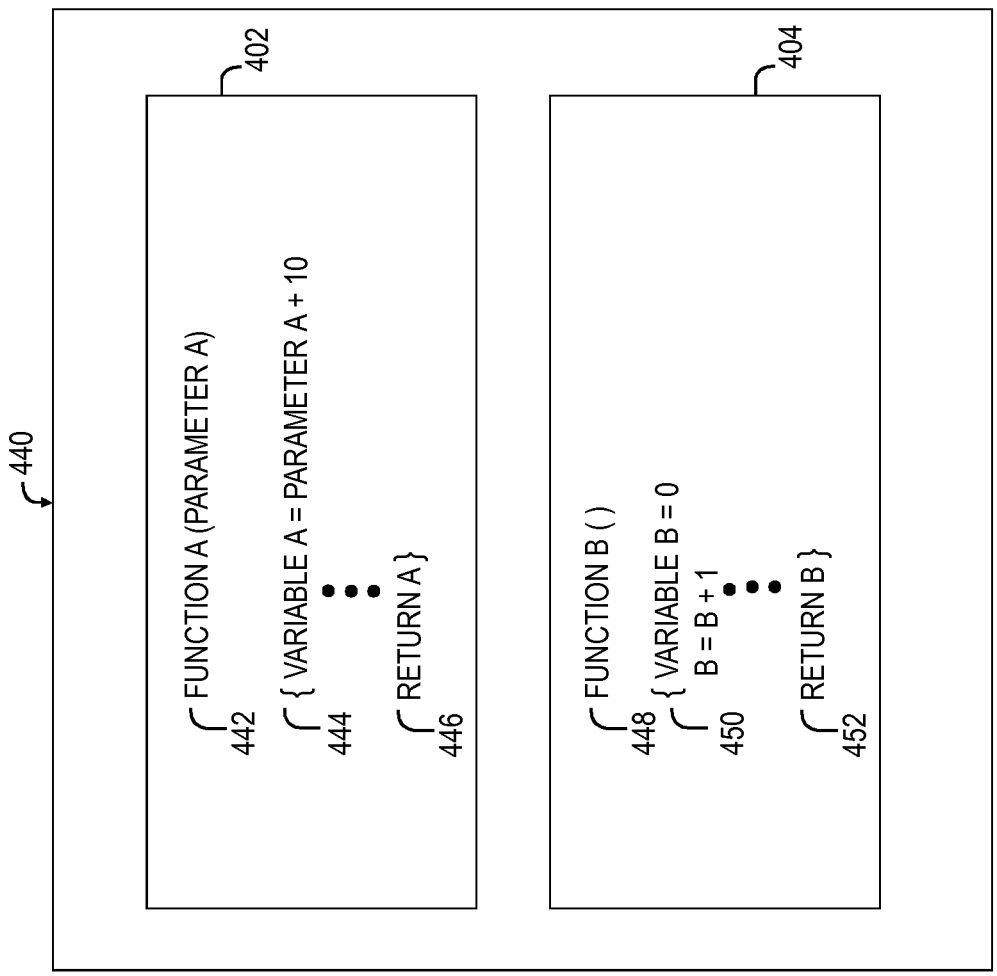
FIG. 4B is a representation of code implementing a plurality of functions, in accordance with some embodiments.

FIG. 4B is a representation 440 of code implementing the first function 402 (e.g., FUNCTION A) and code implementing the second function 404, (e.g., FUNCTION B), in accordance with some embodiments.

Referring to FIG. 4B, in accordance with some embodiments, the first function 402 includes a function signature or other declaration 442 (e.g., FUNCTION A (PARAMETER A), and code 444-446 that follows the signature or other declaration and implements the function. The second function 404 includes a function signature or other declaration 448 (e.g., FUNCTION B ( )), and code 450-452 that follows the signature or other declaration and implements the function.

As stated above, it has been determined that a user's impression of a website or other application may be improved if the amount of time needed to generate an initial rendering of the website or other application is reduced.

As will be further described below, in accordance with some embodiments, the amount of time needed to generate an initial rendering of the website or other application is reduced by partitioning the functions used by the web site or other application into a plurality of files and downloading one or more of the files prior to downloading one or more others of the files.

Figure 5A:
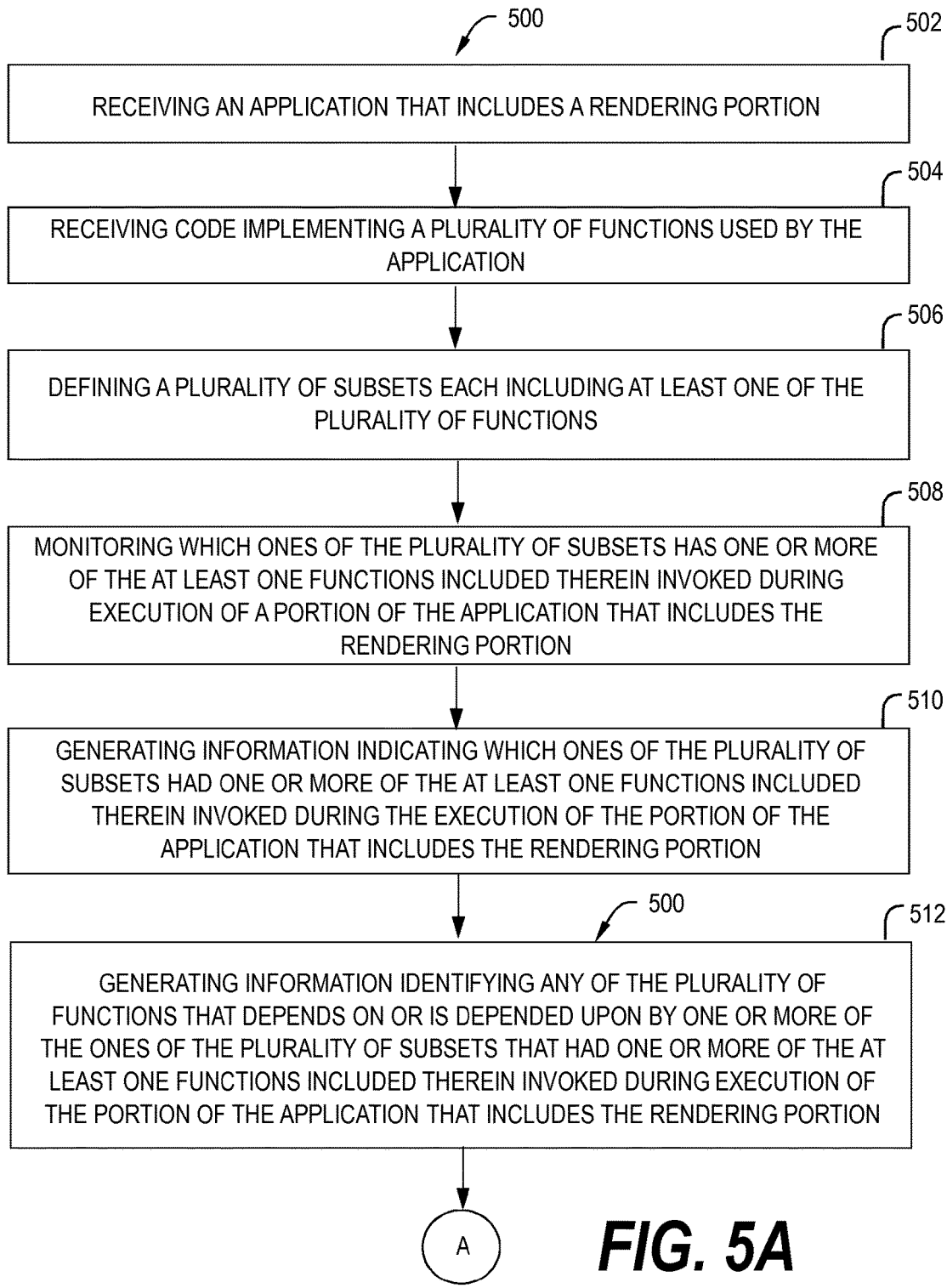

FIGS. 5A-5B are a flow chart of a method 500, in accordance with some embodiments.

In some embodiments, one or more portions of the method may be performed during a design time (e.g., initial and/or modification) of an application.

In some embodiments, one or more portions of the method may be performed by the system 100, e.g., one or more processing devices in the system 100.

Referring to FIGS. 5A-5B, at 502, the method may include receiving an application that includes a rendering portion.

In some embodiments, the application may be associated with a website, e.g., an application (or portion thereof) that is executable as a result of a user navigating to a web page of a website. In some embodiments, the application may be similar to the application represented in FIG. 3A.

Referring again to FIGS. 5A-5B, at 504, the method may further include receiving code implementing a plurality of functions used by the application. In some embodiments, this comprises receiving a master resource file that includes the code implementing the plurality of functions.

In some embodiments, the code implementing the plurality of functions may be similar to the code implementing the plurality of functions shown in FIG. 4A.

Figure 6A:
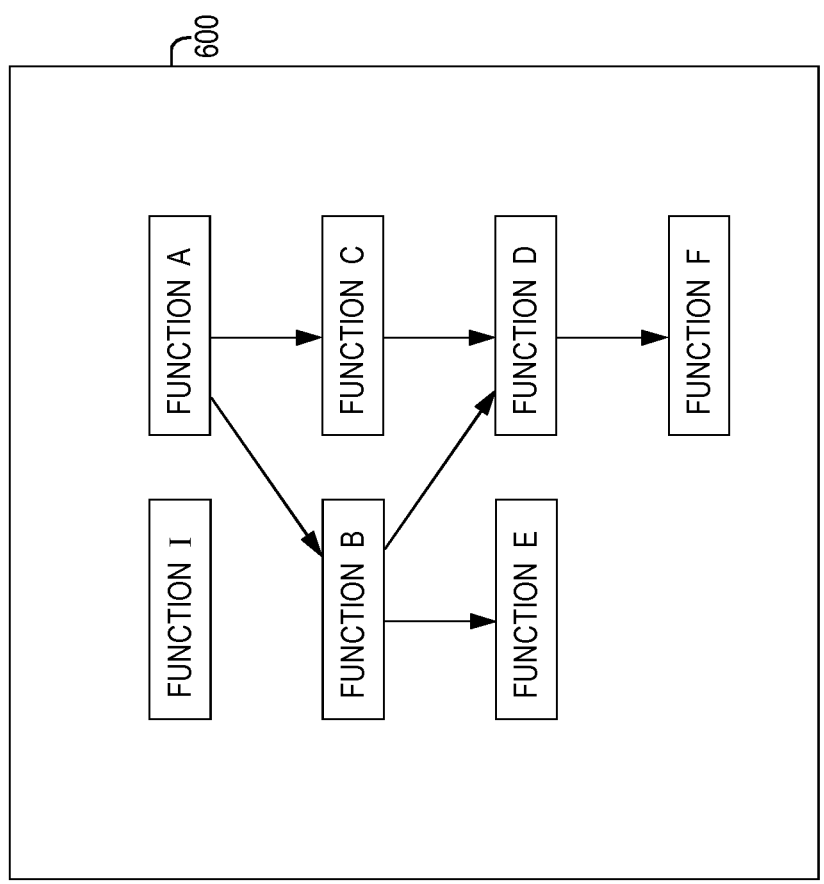
FIG. 6A is a diagram of a master resource file, in accordance with some embodiments.

FIG. 6A is a diagram 600 of a master resource file showing (using arrows) which of the plurality of functions in FIG. 4A invoke one or more others of the plurality of functions, in accordance with some embodiments. Each arrow extends from a first function to a second function invoked by the first function.

Referring again to FIGS. 5A-5B, at 506, the method may further include defining a plurality of subsets of the plurality of functions, each of the plurality of subsets including at least one of the plurality of functions.

In some embodiments, the above comprises defining a plurality of subsets each including a respective one of the plurality of functions, such that each of the plurality of functions is a subset of its own.

In some embodiments, the above is inherently performed by the receiving of code implementing the plurality of functions at 504 (FIG. 5A), since each of the plurality of functions is inherently a subset of the plurality of functions, i.e., a subset of one.

In some embodiments, one or more of the plurality of subsets includes more than one of the plurality of functions.

In some embodiments, the defining of the subsets may be based upon information received from a designer, administrator and/or other source.

In some embodiments, default information may be used in the defining of the subsets unless other information is received.

The plurality of subsets will be used in portions of the method 500 that are described below (e.g., monitoring and/or generating information). Thus, one or more reasons for defining the plurality of subsets will become apparent in light of the description that follows.

FIG. 6B is a table 650 showing a plurality of subsets that may be defined, in accordance with some embodiments.

Referring to FIG. 6B, in accordance with some embodiments, as can be seen, the plurality of subsets is equal in number to the plurality of functions and each of the subsets includes a respective one of the plurality of functions.

Referring again to FIGS. 5A-5B, at 508, the method may further include monitoring which ones of the plurality of subsets has one or more of the at least one functions included therein invoked during execution of a portion of the application that includes the rendering portion.

If each of the plurality of functions is a subset of its own, the above comprises monitoring which ones of the plurality of functions was invoked during execution of a portion of the application that includes the rendering portion.

In some embodiments, the portion of the application (during which execution is monitored) is the portion of the application that includes the initial rendering and executes prior to reaching a wait loop associated with waiting for user input.

In some embodiments, the portion of the application (during which execution is monitored) is based at least in part on information received from a designer, administrator and/or other source. For example, a designer and/or administrator may provide information indicating that the portion of the application (during which execution is to be monitored) is the portion of the application that includes the initial rendering and executes prior to reaching a wait loop associated with waiting for user input. Some embodiments may use the above result as a default unless other information is provided.

Some embodiments may allow a designer, administrator and/or other source to provide information indicating that the portion of the application (during which execution is to be monitored) is a subset of the portion of the application that includes the initial rendering and executes prior to reaching a wait loop associated with waiting for user input.

In some embodiments, the monitoring is facilitated by generating a ghost resource file, as will be described below with respect to FIGS. 10A-10B, FIG. 11 and FIG. 12A.

At 510, the method may further include generating information indicating which ones of the plurality of subsets had one or more of the at least one functions included therein invoked during the execution of the portion of the application that includes the rendering portion.

In some embodiments, the above comprises maintaining a log of which ones of the plurality of subsets had one or more of the at least one functions included therein invoked during the execution of the portion of the application that includes the rendering portion.

In some embodiments, it may be desirable for the information to indicate which ones of the plurality of functions were invoked during the execution of the portion of the application that includes the rendering portion.

In some embodiments, each of the plurality of functions is a subset of its own and the generating of information comprises generating information indicating which ones of the plurality of functions was invoked during the execution of the portion of the application that includes the rendering portion.

In some embodiments, the above comprises maintaining a log of which ones of the plurality of functions was invoked during the execution of the portion of the application that includes the rendering portion.

FIG. 7A is a table 700 showing information indicating which ones of the plurality of subsets had one or more of the at least one functions included therein invoked during the execution of the portion of the application that includes the rendering portion, in accordance with some embodiments.

Referring to FIG. 7A, in accordance with some embodiments, the table 700 shows that the subset FUNCTION A, the subset FUNCTION B, the subset FUNCTION D and the subset FUNCTION F each had a function (i.e., FUNCTION A, FUNCTION B, FUNCTION D and FUNCTION F, respectively) included therein invoked during execution of the portion of the application that includes the rendering portion. The subset FUNCTION C, the subset FUNCTION E and the subset FUNCTION I did not.

Figure 7B:
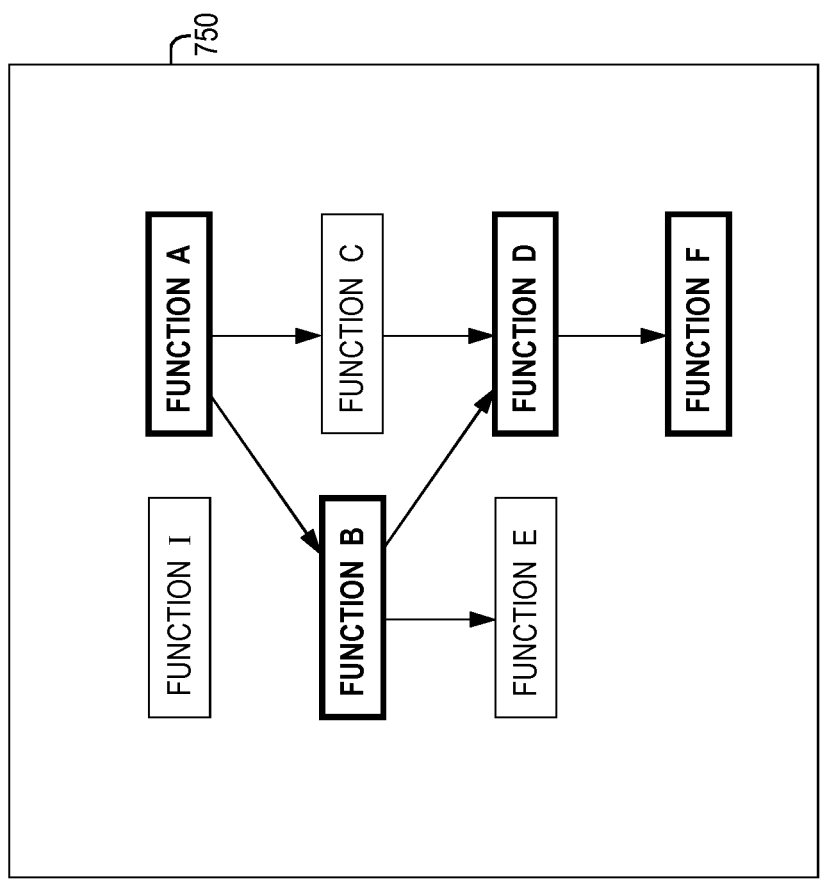
FIG. 7B is a diagram of a master resource file, in accordance with some embodiments.

FIG. 7B is a diagram 750 of a master resource file showing (in bold text and bold outline) which of the plurality of functions were invoked during the execution of the portion of the application that includes the rendering portion, in accordance with some embodiments.

In accordance with some embodiments, code implementing some function(s) cannot be separated from code implementing some other function(s) without altering the desired results of one or more of the functions and/or the application (sometimes referred to herein as not altering the functionality and/or performance).

For example, if a child function is defined within a parent function or relies on variables or parameters that are defined within a greater scope (i.e., the greater scope contains the definition of the child function/variables/parameters), the child function cannot be extracted (separated from the parent or greater scope) because doing so would change the scope within which the function is defined and the data upon which the definition and/or execution of the child function relies, would no longer be available.

FIG. 8A is a representation of such an architecture, in accordance with some embodiments.

Referring to FIG. 8A, in this architecture, a function F1 has a context 800. A function F2 and a variable V1 are each defined within the context 800 of function F1. The function F2 has a context 802 and includes code that references (represented by arrow 804) the variable V1, which is outside the context of function F2. In this architecture, the function F2 depends on the function F1 and cannot be separated from the parent or greater scope without altering the desired results of one or more of the functions and/or the application.

On the other hand, if a function relies on global variables (available to any scope) or purely local variables (defined within the function itself) then such function and its variables can be extracted (separated from the parent or greater scope).

FIG. 8B is a representation of such an architecture, in accordance with some embodiments.

Referring to FIG. 8B, in this architecture, the function F2 does not reference the variable V1 or any other variable or value defined within function F1. In this architecture, the function F2 does not depend on the function F1 and can be separated from the parent or greater scope.

Thus, referring again to FIGS. 5A-5B, at 512, the method may further include generating information identifying any of the plurality of functions that depends on or is depended upon by one or more of the ones of the plurality of subsets that had one or more of the at least one functions included therein invoked during execution of the portion of the application that includes the rendering portion.

Unless stated otherwise, a function depends on one of the subsets if the function depends on one or more of the at least one function included in the one of the subsets. A function is depended upon by one of the subsets if the function is depended upon by one or more of the at least one functions included in the one of the subsets.

Also unless stated otherwise, a function depends on or is depended upon by another function if separating the two functions such that the two function are in separate files would have the effect of altering a result of either of the functions.

In accordance with some embodiments, the generating of information at 512 comprises determining whether a function or the variables and parameters upon which it depends are defined within a greater scope or a containing parent function.

Unless stated otherwise, a function depends on a variable and/or a parameter if it requires access to a value of the variable and/or parameter in order to provide a desired result.

Referring again to FIGS. 5A-5B, at 514, the method may further include generating a first set of one or more files that includes: (i) code implementing ones of the plurality of functions that are included in one or more of the plurality of subsets that had one or more of the at least one functions included therein invoked during execution of the portion of the application that includes the rendering portion, and (ii)

code implementing any of the plurality of functions that depends on or is depended upon by one or more of the ones of the plurality of subsets that had one or more of the at least one functions included therein invoked during execution of the portion of the application that includes the rendering portion.

As used herein, the term "any" means "one", if "one" but not more than "one" exists, and means "one or more", if more than "one" exists.

In some embodiments, the first set of one or more files may include code implementing every one of the plurality of functions that depends on or is depended upon by one or more of the ones of the plurality of subsets that had one or more of the at least one functions included therein invoked during execution of the portion of the application that includes the rendering portion.

As used herein, the term "first set of one or more files" is not meant to imply that the first set of one or more files is first in time or sequence.

In some embodiments, multiple first sets of one or more files may be generated.

In some embodiments, the first set of one or more files may include only one file.

In some other embodiments, the first set of one or more files may include a plurality of files. In some of such embodiments, the generating of the first set of one or more files may comprise generating a first set of one or more files and partitioning one or more of the one or more files into a greater number of files thereby resulting in a new first set of one or more files. In some embodiments, the new first set of one or more files may include one or more functions not included in the prior first set of one or more files. In some embodiments, the above may be repeated as many times as may be desired.

The generating of the first set of one or more files may be performed in any manner. In some embodiments, the generating of the first set of one or more files comprises modifying one or more existing files. In some embodiments, the generating of the first set of one or more files comprises creating one or more new files.

In accordance with some embodiments, the generating of the first set of one or more files is based at least in part on: (a) the information indicating which ones of the plurality of subsets had one or more of the at least one functions included therein invoked during the execution of the portion of the application that includes the rendering portion and (b) the information identifying any of the plurality of functions that depends on or is depended upon by one or more of the ones of the plurality of subsets that had one or more of the at least one functions included therein invoked during execution of the portion of the application that includes the rendering portion.

At 516, the method may further include generating a second set of one or more files that includes code implementing ones of the plurality of functions for which implementation code is not included in the first set of one or more files.

As used herein, the term "second set of one or more files" is not meant to imply that the second set of one or more files is second in time or sequence.

In some embodiments, multiple second sets of one or more files may be generated.

In some embodiments, the second set of one or more files may include only one file. In some other embodiments, the second set of one or more files may include a plurality of files. In some of such embodiments, the generating of the second set of one or more files may comprise generating a second set of one or more files and partitioning one or more of the one or more files into a greater number of files thereby resulting in a new second set of one or more files. In some embodiments, the new second set of one or more files may include one or more functions not included in the prior second set of one or more files. In some embodiments, the above may be repeated as many times as may be desired.

The generating of the second set of one or more files may be performed in any manner. In some embodiments, the generating of the second set of one or more files comprises modifying one or more existing files. In some embodiments, the generating of the second set of one or more files comprises creating one or more new files.

In some embodiments, the first set one or more files and the second set of one or more files are mutually exclusive in terms of content.

In some embodiments, the generating of the first set of one or more files and the generating of the second set of one or more files are performed by partitioning the plurality of functions into the first set of one or more files and the second set of one or more functions.

In some embodiments, the second set of one or more files further includes code implementing one or more of the plurality of functions for which implementation code is included in the first set of one or more files.

In some embodiments, the first set of one or more files and/or the second set of one or more files may include one or more functions not included in the plurality of functions.

Figure 9A:
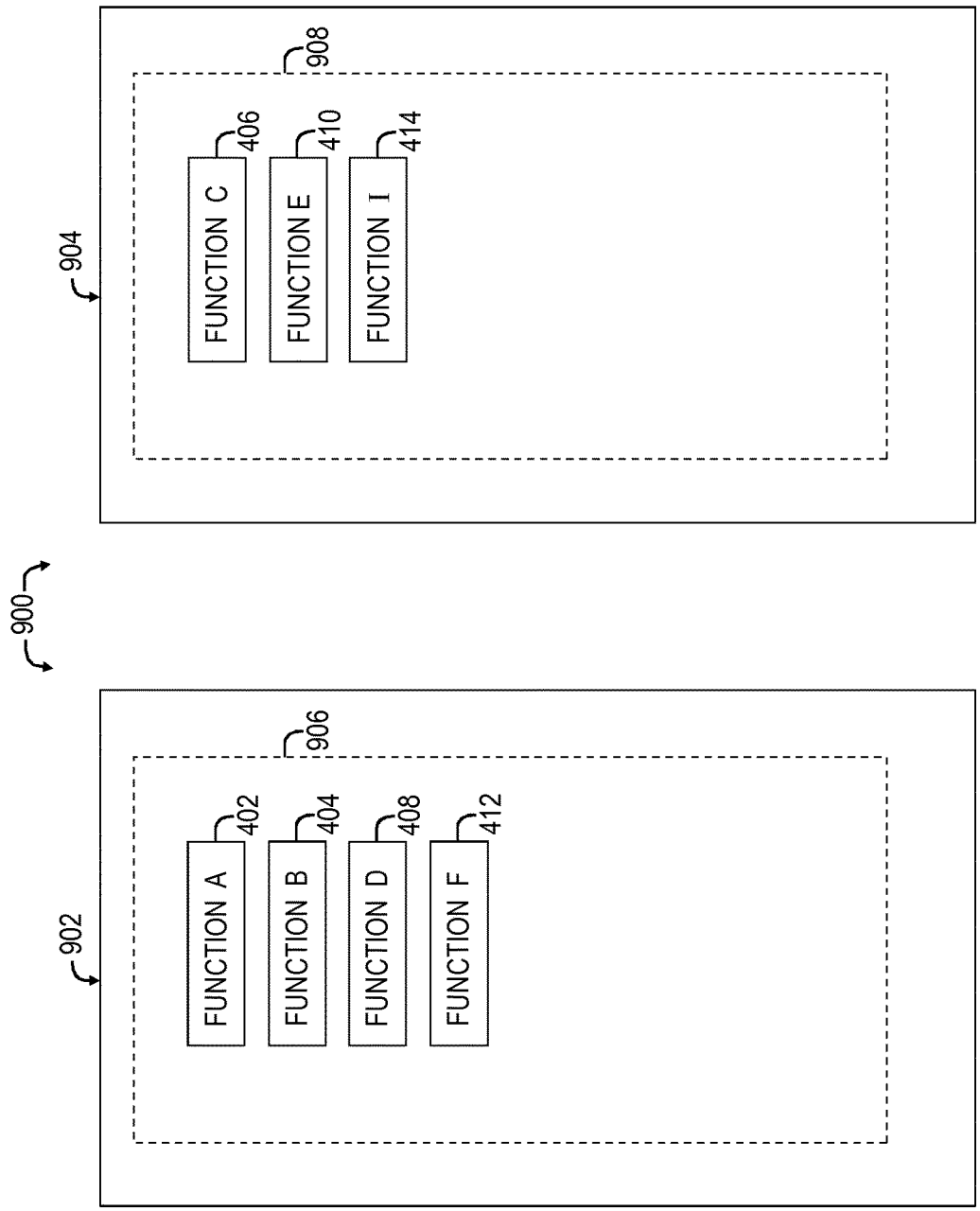
FIG. 9A is a diagram of a first set of one or more files and a second set of one or more files, in accordance with some embodiments.

FIG. 9A is a diagram 900 of a first set of one or more files 902 and a second set of one or more files 904 that may be generated by the method 500, in accordance with some embodiments.

Referring to FIG. 9A, in accordance with some embodiments, the first set of one or more files 902 and the second set of one or more files may each include only one file. For example, in the illustrated embodiment, the first set of one or more files 902 includes a first file 906 that includes all of the code that is included in the first set of one or more files 902. Thus, the first file 906 includes code implementing four functions, e.g., FUNCTION A, FUNCTION B, FUNCTION D and FUNCTION F.

In the illustrated embodiment, the second set of one or more files 904 includes a first file 908 that includes all of the code that is included in the second set of one or more files 904. Thus, the first file 908 includes code implementing three functions, e.g., FUNCTION C, FUNCTION E and FUNCTION I.

Figure 9B:
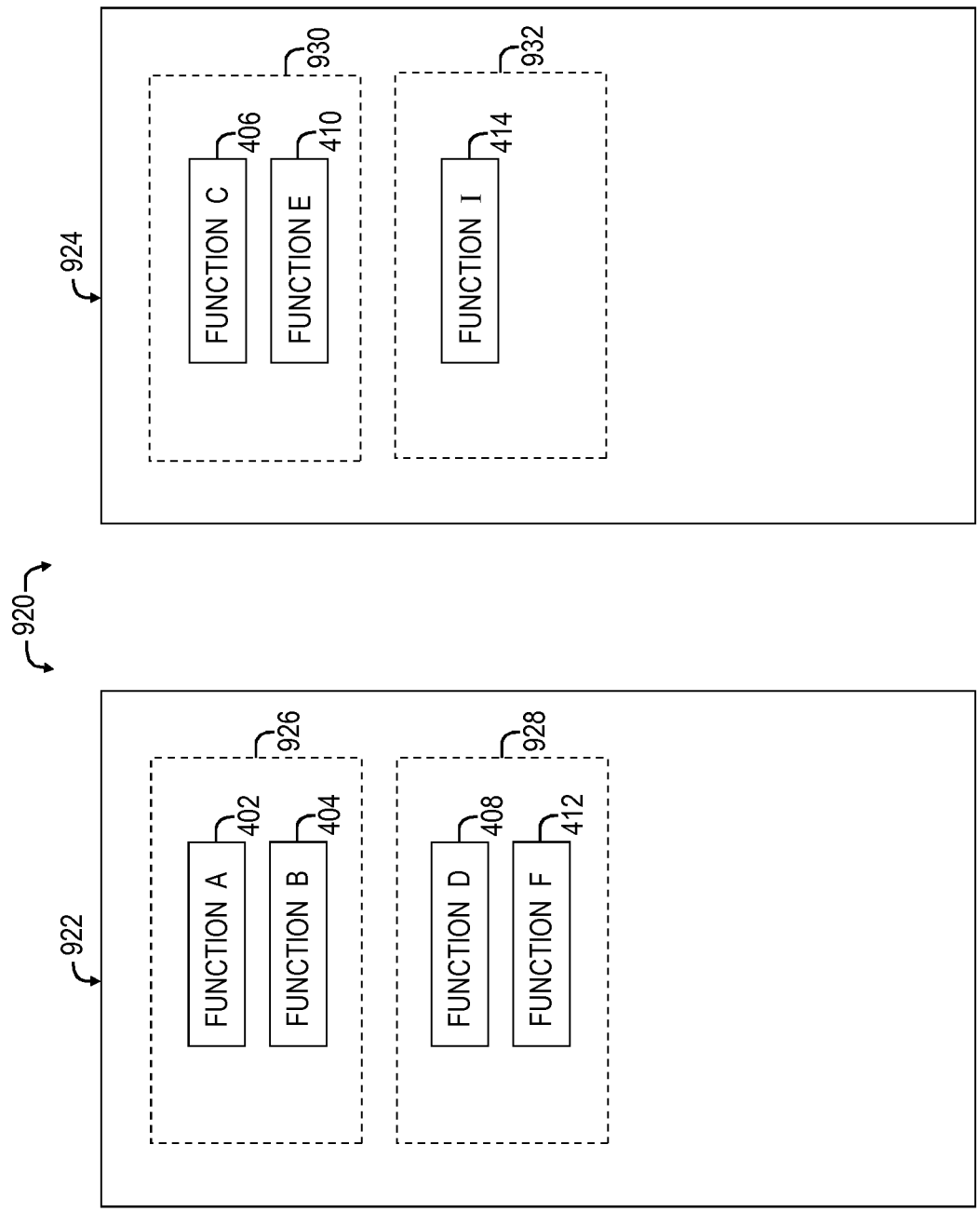
FIG. 9B is a diagram of a first set of one or more files and a second set of one or more files, in accordance with some embodiments.

FIG. 9B is a diagram 920 of another first set of one or more files 922 and another second set of one or more files 924 that may be generated by method 500, in accordance with some embodiments.

Referring to FIG. 9B, in accordance with some embodiments, the first set of one or more files 922 and/or the second set of one or more files 924 may include more than one file. For example, in the illustrated embodiment, the first set of one or more files 922 includes two files, e.g., a first file 926 and a second file 928, which together include all of the code that is included in the first set of one or more files 922. In the illustrated embodiment, the first file 926 includes code implementing two functions, e.g., FUNCTION A and FUNCTION B. The second file 928 includes code implementing two functions, e.g., FUNCTION D and FUNCTION F.

In the illustrated embodiment, the second set of one or more files 924 includes two files, e.g., a first file 930 and a second file 932, which together include all of the code that is included in the second set of one or more files 924. In the illustrated embodiment, the first file 930 includes code implementing two functions, e.g., FUNCTION C and FUNCTION E. The second file 928 includes code implementing one function, e.g., and FUNCTION I.

In some embodiments, the first set of one or more files and/or the second set of one or more files were generated using one or more methods disclosed herein.

Figure 9C:
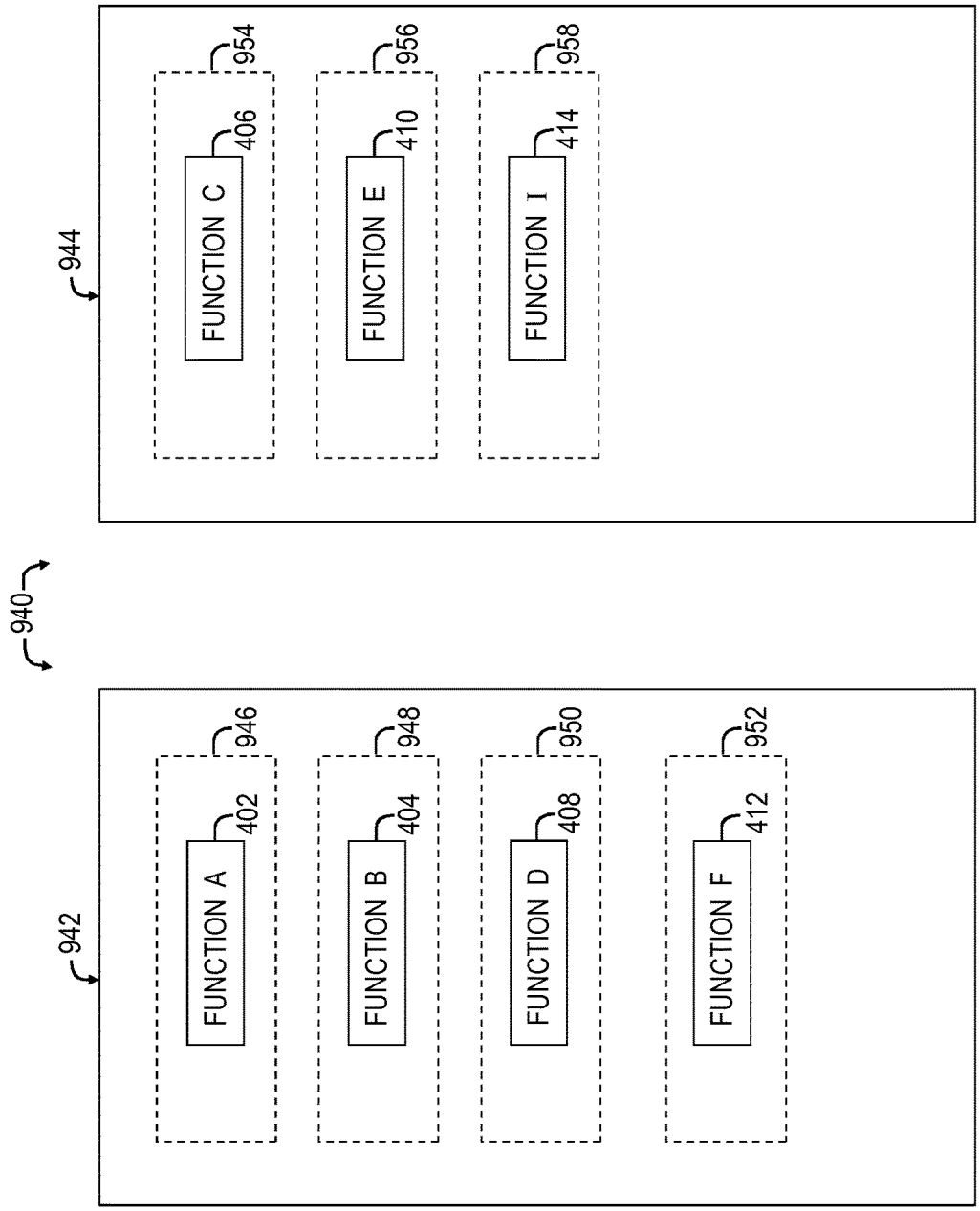
FIG. 9C is a diagram of a first set of one or more files and a second set of one or more files, in accordance with some embodiments.

FIG. 9C is a diagram 940 of another first set of one or more files 942 and another second set of one or more files 944 that may be generated by method 500, in accordance with some embodiments.

Referring to FIG. 9C, in accordance with some embodiments, the first set of one or more files 942 and/or the second set of one or more files 944 may include more than two files. For example, in the illustrated embodiment, the first set of one or more files 942 includes four files, e.g., a first file 946, a second file 948, a third file 950 and a fourth file 952, which together include all of the code that is included in the first set of one or more files 942. In the illustrated embodiment, the first file 946, the second file 948, the third file 950 and the fourth file 952 each include code implementing one function, e.g., FUNCTION A, FUNCTION B, FUNCTION D and FUNCTION F, respectively.

In the illustrated embodiment, the second set of one or more files 944 includes three files, e.g., a first file 954, a second file 956 and a third file 958, which together include all of the code that is included in the second set of one or more files 924. In the illustrated embodiment, the first file 954, the second file 956 and the third file 958 each include code implementing one function, e.g., FUNCTION C, FUNCTION E, and FUNCTION I, respectively.

In some embodiments, the first set of one or more files and/or the second set of one or more files were generated using one or more methods disclosed herein.

In some embodiments, one or more of the functions for which implementation code is not included in the first set of one or more files may be represented in the first set of one or more files by a function signature (or other declaration) and a respective stub, but not the code that follows the signature or other declaration and implements the function.

Figure 9D:
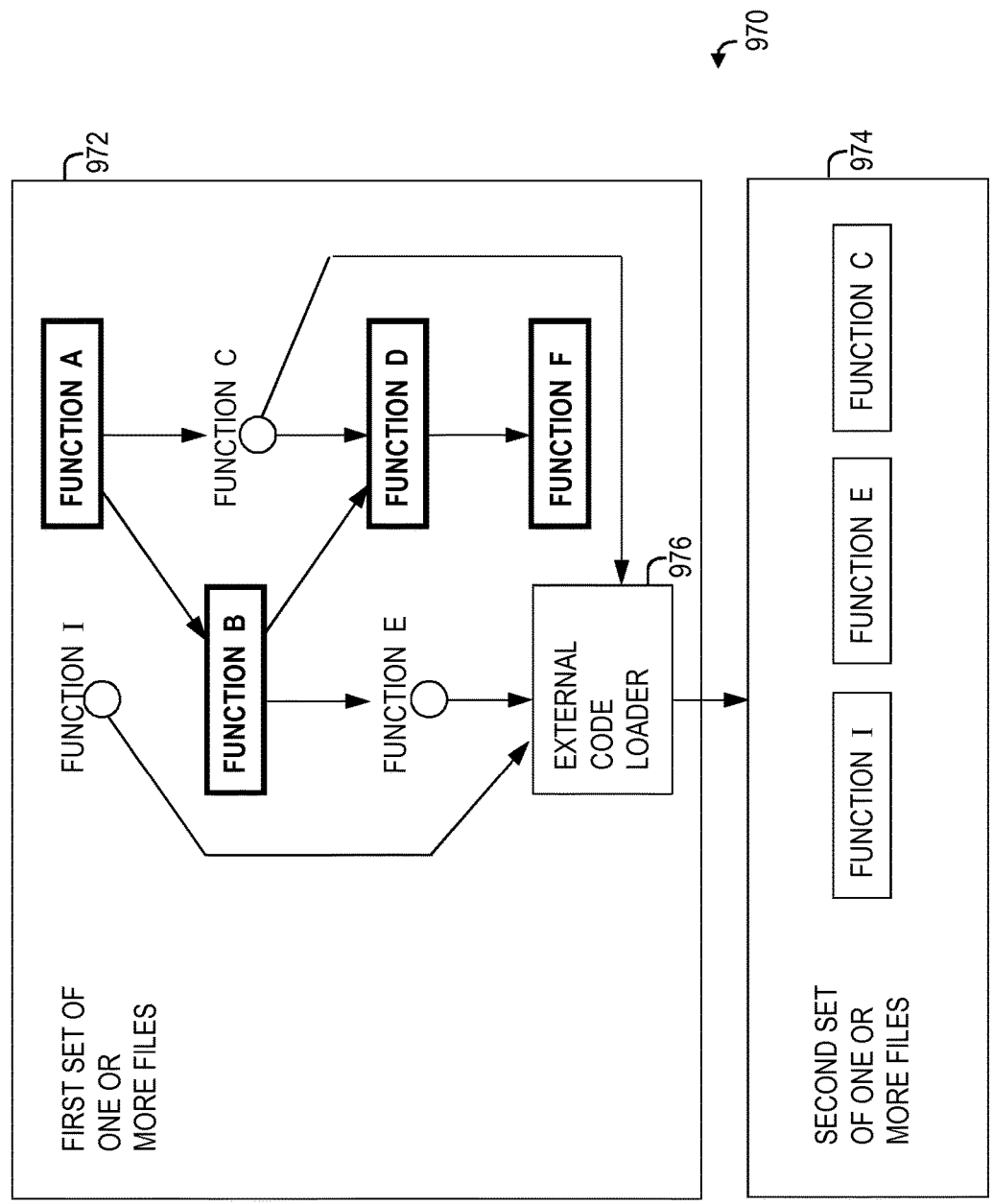
FIG. 9D is a diagram of a first set of one or more files and a second set of one or more files, in accordance with some embodiments.

FIG. 9D is a diagram 970 of a first set of one or more files 972 and a second set of one or more files 974 that may be generated by method 500, in accordance with some embodiments. The diagram 970 shows (using arrows) which of the plurality of functions invoke one or more others of the plurality of functions. Each arrow extends from a first function to a second function invoked by the first function.

Referring to FIG. 9D, in accordance with some embodiments, the first set of one or more files 972 includes code implementing FUNCTION A, FUNCTION B, FUNCTION D and FUNCTION F. The second set of one or more files 974 includes code implementing FUNCTION C, FUNCTION E and FUNCTION I.

Code implementing the functions that are included in the first set of one or more files is shown in bold type and outline.

Functions for which implementation code is not included in the first set of one or more files 972 are represented in the first set of one or more files 972 by a function signature (or other declaration) and a respective stub (which is represented in the diagram 970 as a circle), but not the code that follows the signature or other declaration and implementing the function.

Upon invocation of one of such functions (e.g., FUNCTION E) for which implementation code is not included in the first set of one or more files 972, the respective stub may initialize or otherwise invoke an external code loader 976 that locates and fetches code (within the second set of one or more files 974) implementing the function (e.g., FUNCTION E) for which implementation code is not included in the first set of one or more files 972. In some embodiments, the external code loader 976 comprises code written in Javascript.

Figure 9E:
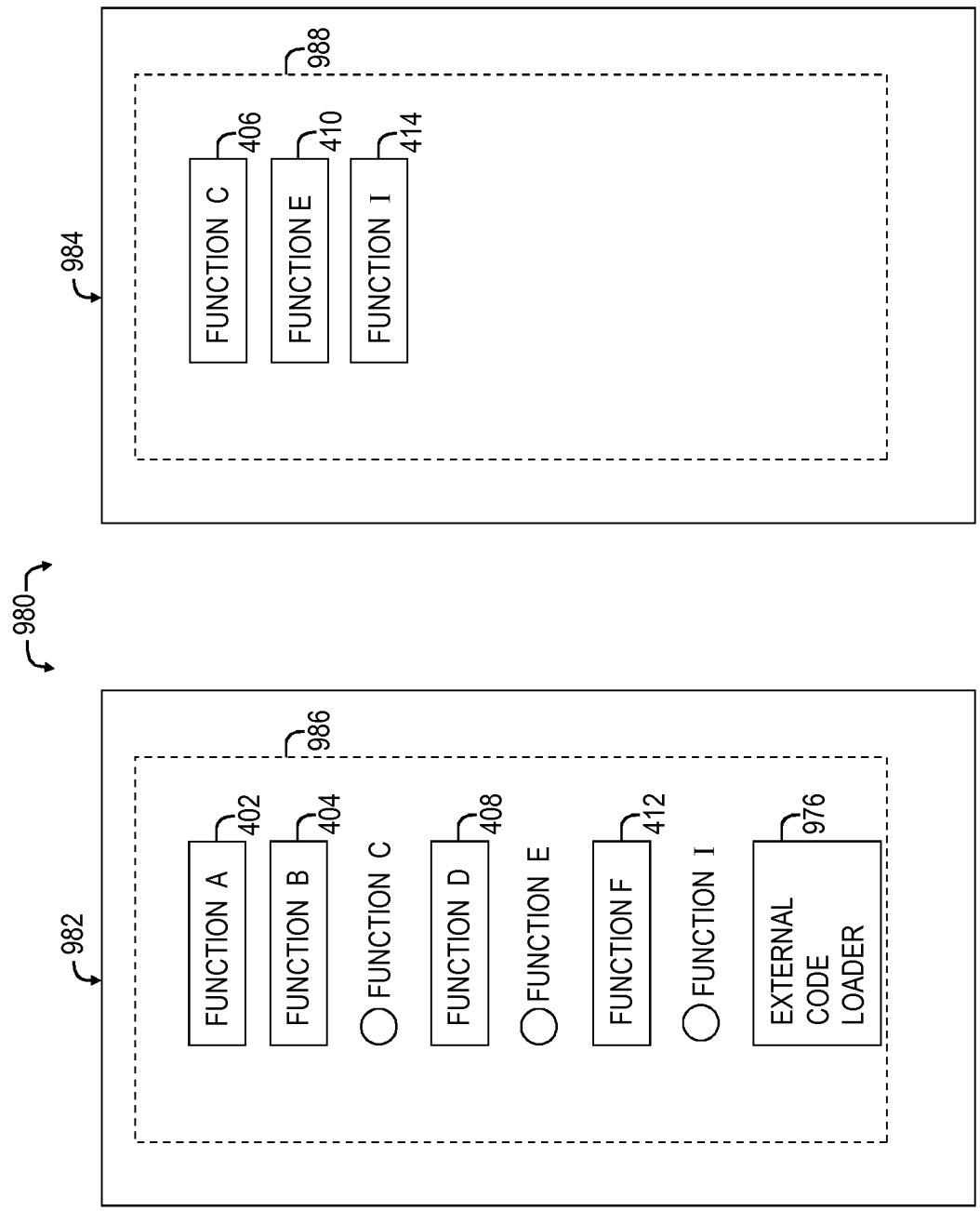
FIG. 9E is a diagram of a first set of one or more files and a second set of one or more files, in accordance with some embodiments.

FIG. 9E is a diagram 980 of another first set of one or more files 982 and another second set of one or more files 984 that may be generated by method 500, in accordance with some embodiments.

Referring to FIG. 9E, in accordance with some embodiments, the first set of one or more files 982 includes one file 986 that includes all of the code that is included in the first set of one or more files 972 (FIG. 9D). The second set of one or more files 984 includes one file 988 that includes all of the code that is included in the second set of one or more files 974 (FIG. 9D).

Unlike the diagram 970 (FIG. 9D), the diagram 980 does not show which of the plurality of functions invoke one or more others of the plurality of functions.

Referring again to FIGS. 5A-5B, at 518, the method may further include after the generating of the first set of one or more files, receiving a request for the first set of one or more files from a remote device via a network.

At 520, the method may further include transmitting the first set of one or more files to a remote device via a network.

In some embodiments, the first set of one or more files includes a plurality of files. In these embodiments, the plurality of files may be transmitted in manner. In some embodiments, the plurality of files may be transmitted one after the other. In some other embodiments, the plurality of files may be transmitted concurrently (at least in part).

At 522, the method may further include transmitting the second set of one or more files to the remote device via the network after the transmitting the first set of one or more files to the remote device via the network.

In some embodiments, the second set of one or more files includes a plurality of files. In these embodiments, the plurality of files may be transmitted in manner. In some embodiments, the plurality of files may be transmitted one after the other. In some other embodiments, the plurality of files may be transmitted concurrently (at least in part).

In some embodiments, portions 502-516 of the method 500 are performed during design time of the application.

In some embodiments, portions 518-522 are performed during run time of the application.

In accordance with some embodiments, the method may further include modifying the application to request and receive the first set of one or more files and/or to request and receive the second set of one or more files.

Figure 9F:
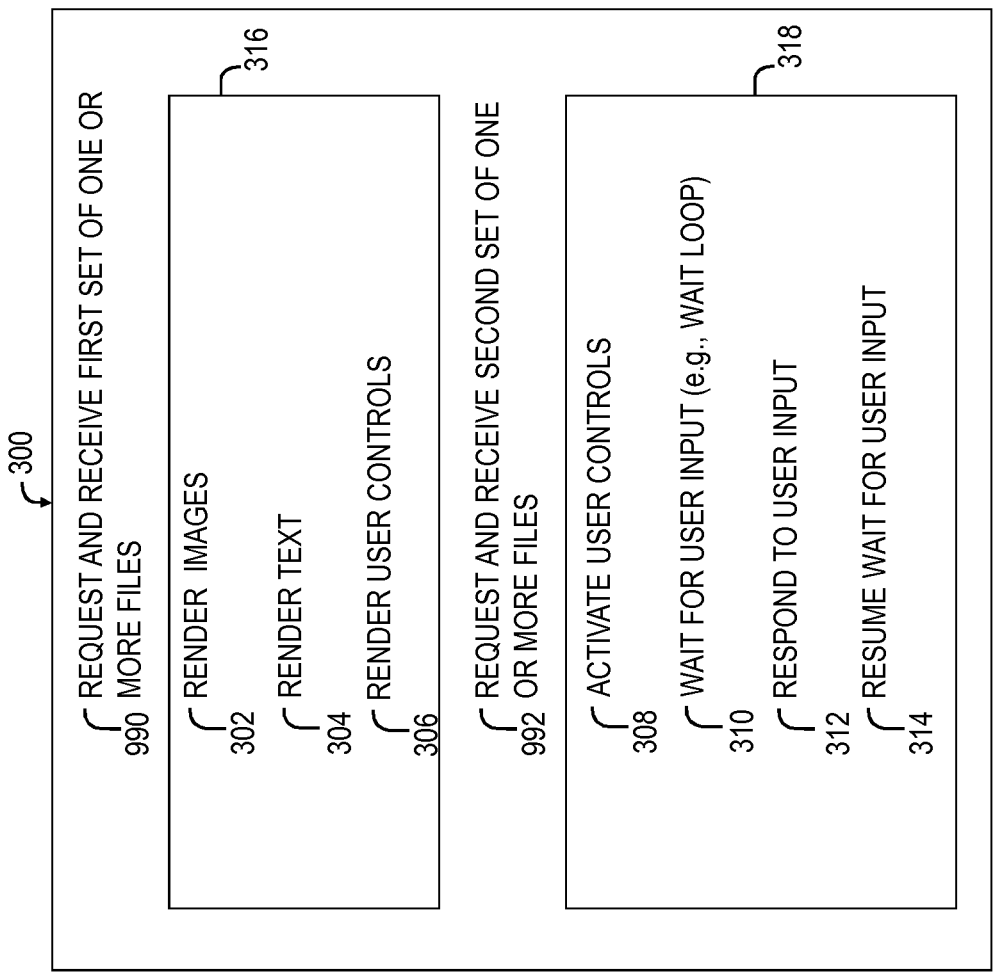
FIG. 9F is a representation of a portion of an application, in accordance with some embodiments.

FIG. 9F is a representation of a portion of the application 300 represented in FIG. 3A after modifying the application to request and receive 990 a first set of one or more files and to request and receive 992 a second set of one or more files, in accordance with some embodiments.

Figure 9G:
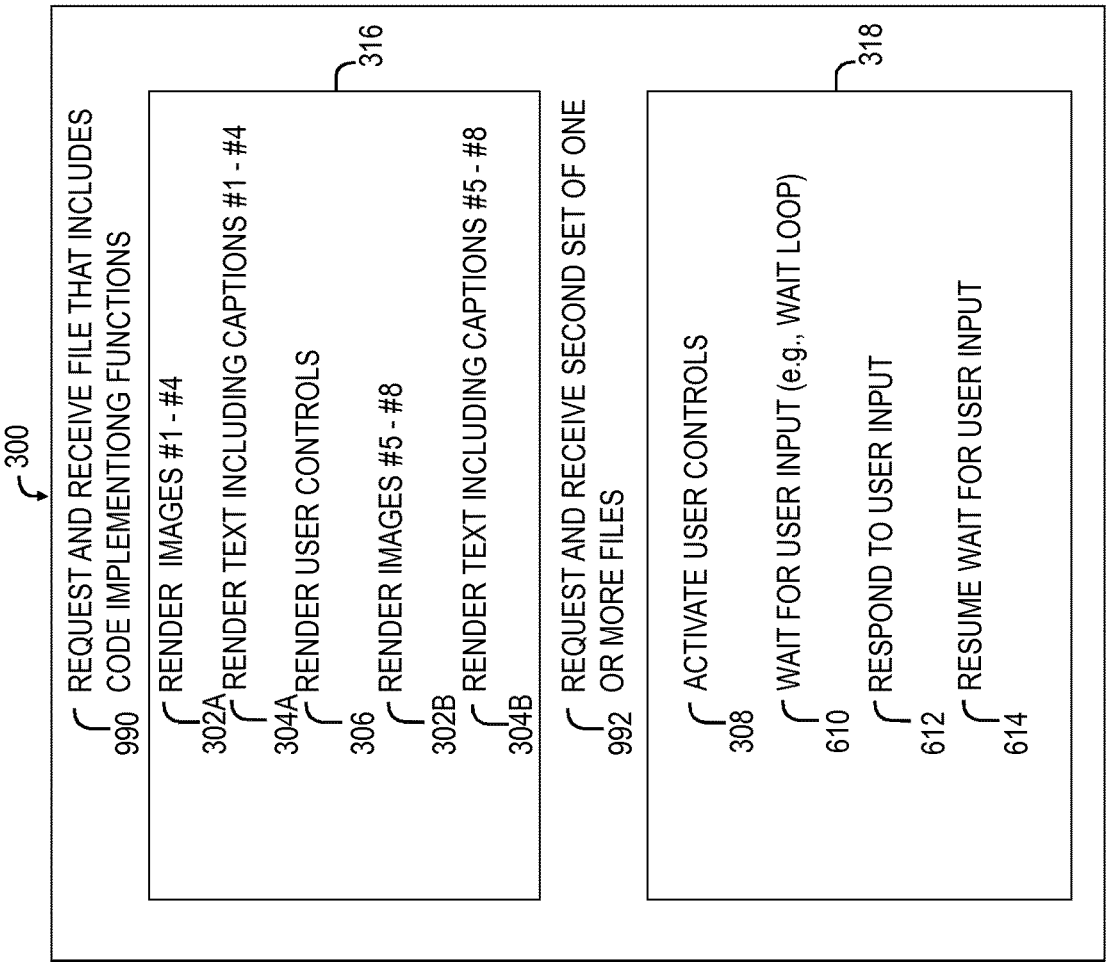
FIG. 9G is a representation of a portion of an application, in accordance with some embodiments.

FIG. 9G is a representation of a portion of the application 300 represented in FIG. 3B after modifying the application to request and receive 990 a first set of one or more files and to request and receive 992 a second set of one or more files, in accordance with some embodiments.

Figure 9H:
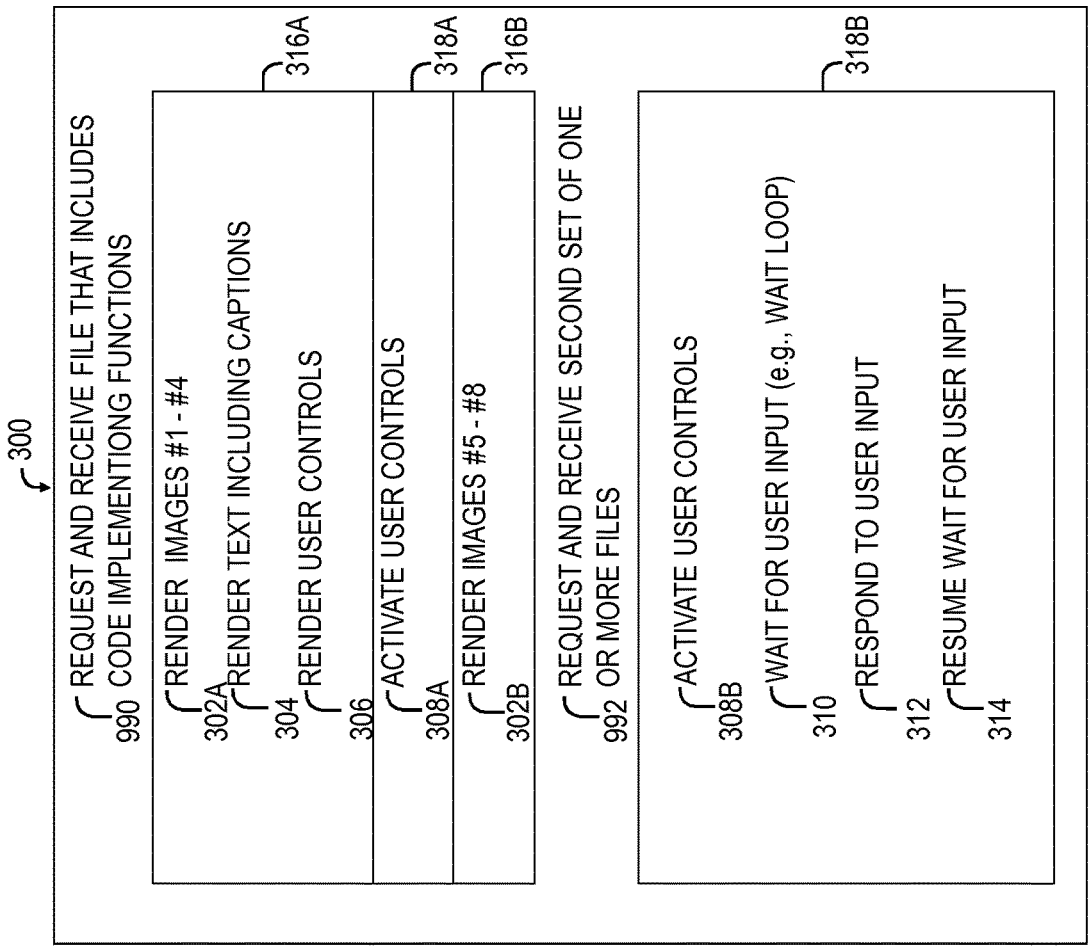
FIG. 9H is a representation of a portion of an application, in accordance with some embodiments.

FIG. 9H is a representation of a portion of the application 300 represented in FIG. 3C after modifying the application to request and receive 990 a first set of one or more files and to request and receive 992 a second set of one or more files, in accordance with some embodiments.

In accordance with some embodiments, the amount of time needed to generate an initial rendering of the website or other application is reduced by partitioning the functions used by the web site or other application into a plurality of files and downloading one or more of the files prior to downloading one or more others of the files.

In accordance with some embodiments, a first set of one or more files may include only the functions that are required for an initial rendering of a website.

In accordance with some embodiments, functions that are required for functionality but not the initial rendering of the website may be included in a second set of one or more files, which may be received (e.g., loaded) after the initial rendering of the website.

In accordance with some embodiments, no dependencies or functionalities are altered or broken.

It should be noted that the method 500 is not limited to the order shown in the flow chart. Rather, embodiments of the method 500 may be performed in any order that is practicable. For that matter, unless stated otherwise, any method disclosed herein may be performed in any order that is practicable. Notably, some embodiments may employ one or more portions of a method without one or more other portions of the method.

It should also be noted that the method 500 and/or any other method described herein may be performed by hardware, software (which may include low level language code and/or high language code) or any combination thereof.

In some embodiments, a non-transitory computer readable medium may have instructions stored thereon, which if executed by a machine result in performance of the method 500 (or one or more portions thereof) and/or any other method (or portion thereof) described herein.

As stated above, in some embodiments, the monitoring in method 500 is facilitated by generation of a ghost resource file described with respect to FIGS. 10A-10B, FIG. 11 and FIG. 12A.

Figure 10A:
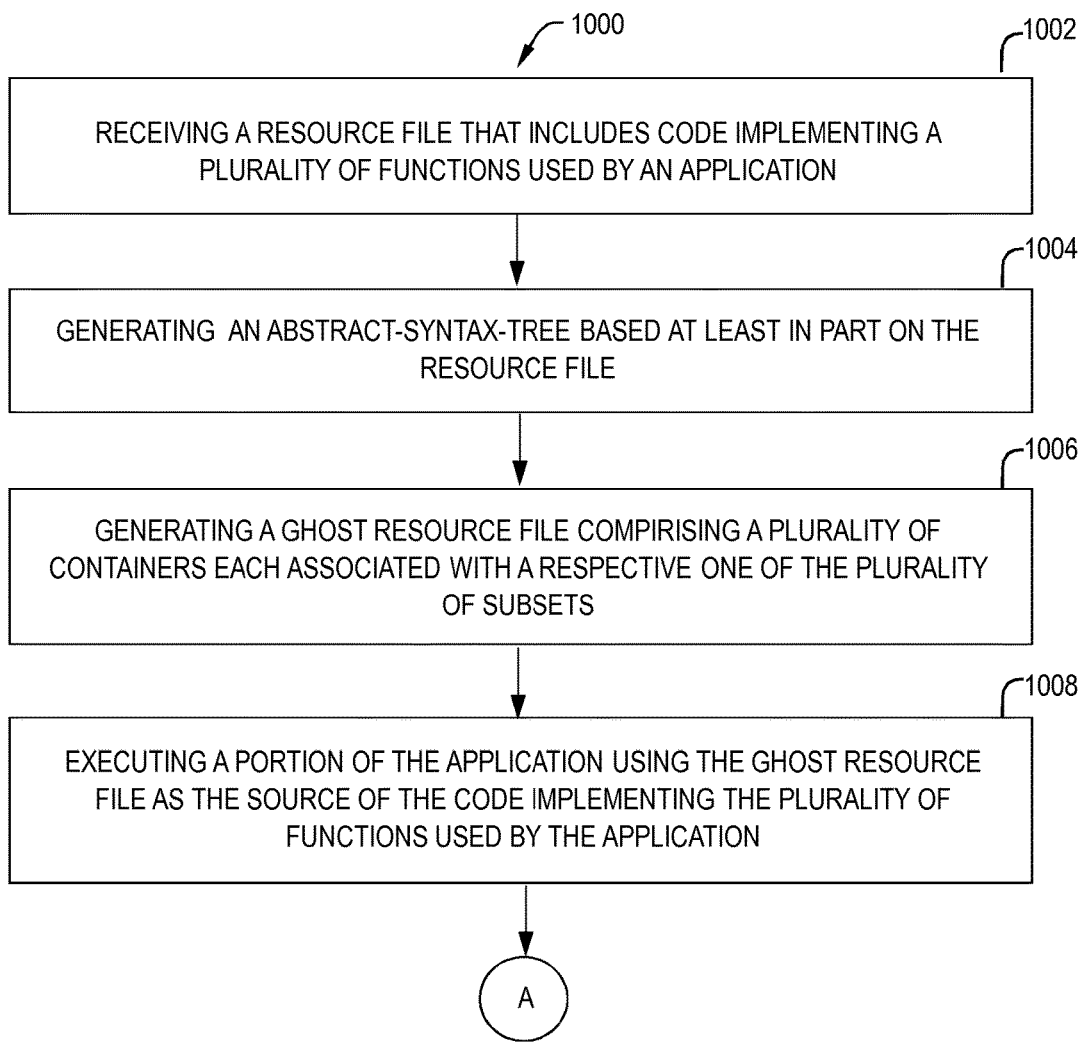
FIGS. 10A-10B are a flow chart of a method, in accordance with some embodiments.
Figure 10B:
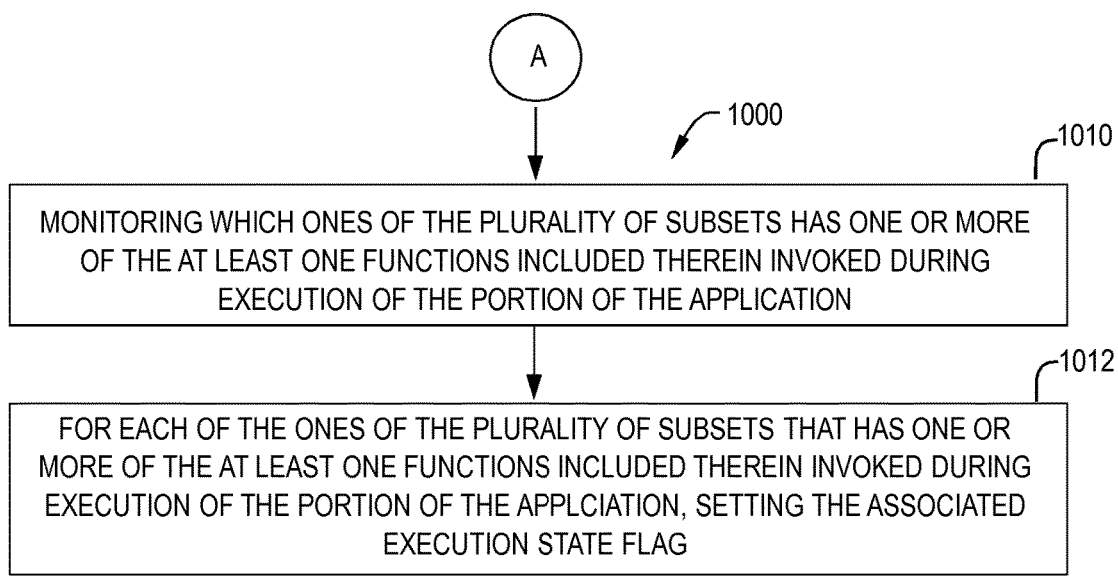

FIGS. 10A-10B are a flow chart of a method 1000 that may be used in generating and using a ghost resource file, in accordance with some embodiments.

In some embodiments, one or more portions of the method may be performed during a design time of an application and/or a modification time of the application.

In some embodiments, one or more portions of the method may be performed by the system 100, e.g., one or more processing devices, in the system 100.

Referring to FIGS. 10A-10B, at 1002, the method may include receiving a resource file (sometimes referred to herein as a master resource file) that includes code implementing a plurality of functions used by an application.

At 1004, the method may further include generating an abstract-syntax-tree based at least in part on the master resource file.

In some embodiments, the abstract-syntax tree includes the code implementing each of the plurality of functions.

In some embodiments, a profiler is used in generating the abstract-syntax-tree.

At 1006, the method may further include generating a ghost resource file comprising a plurality of containers (e.g., wrappers or other types of containers), each of the plurality of containers being associated with a respective one of the plurality of subsets and comprising: (i) code implementing the at least one of the plurality of functions that are included in the respective one of the plurality of subsets, and (ii) a flag (sometimes referred to herein as an execution state flag) that is associated with the respective one of the plurality of subsets and indicating whether the respective one of the plurality of subsets has one or more of the at least one functions included therein invoked during execution of the portion of the application that includes the rendering portion.

Figure 11:
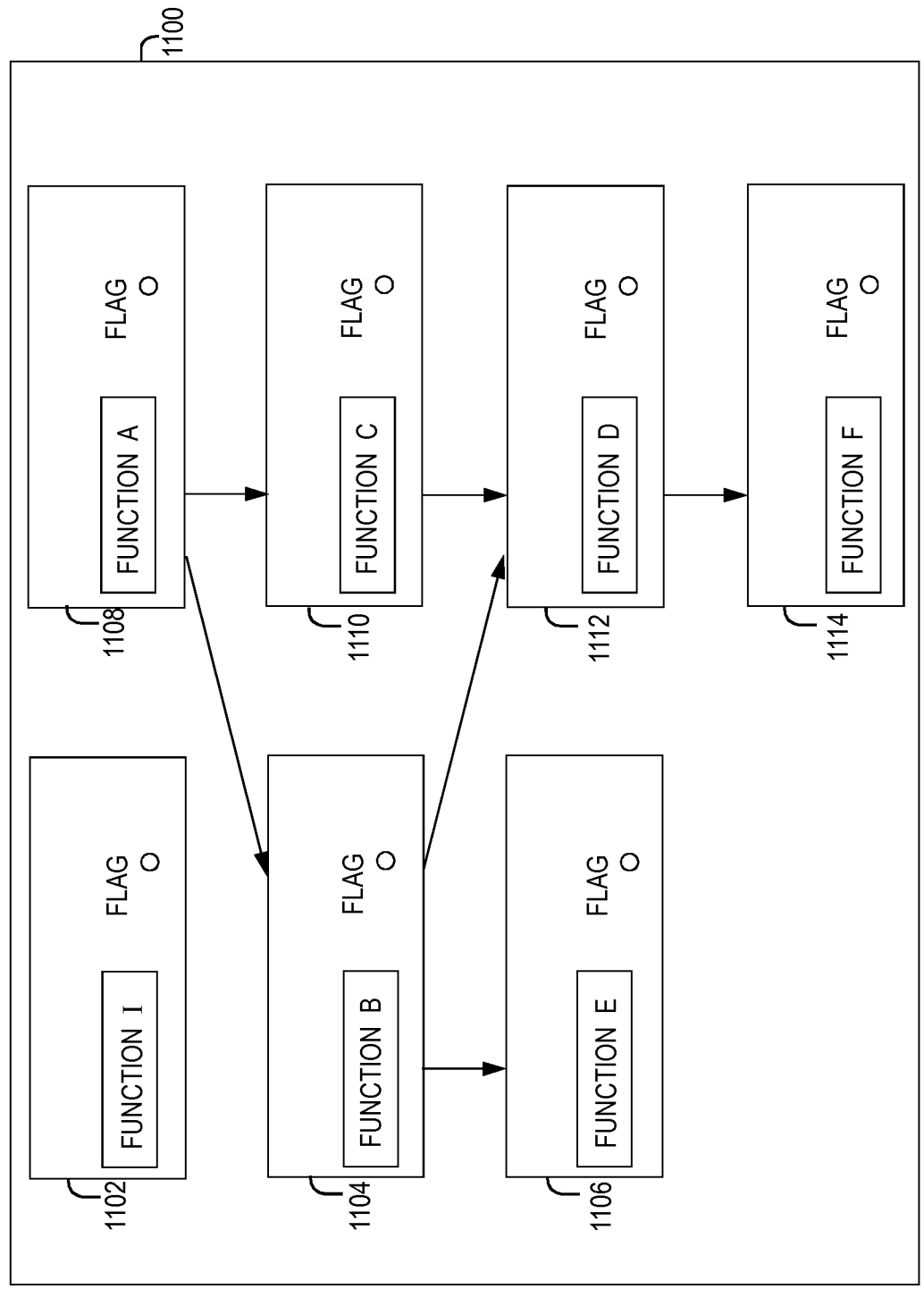
FIG. 11 is a representation of a portion of a ghost resource file, in accordance with some embodiments.

FIG. 11 is a representation of a portion of a ghost resource file 1100 prior to setting any of the execution state flags, in accordance with some embodiments.

Referring to FIG. 11, in accordance with some embodiments, the portion of the ghost resource file 1100 includes a plurality of containers 1102-1114. Each of the plurality of containers 1102-1114 is associated with a respective one of the plurality of subsets and comprising: (i) code implementing the at least one of the plurality of functions that are included in the respective one of the plurality of subsets, and (ii) a flag that is associated with the respective one of the plurality of subsets and indicating whether the respective one of the plurality of subsets has one or more of the at least one functions included therein invoked during execution of the portion of the application that includes the rendering portion.

Referring again to FIGS. 10-10B, at 1008, the method may further include executing a portion of the application using the ghost resource file as the source of the code implementing the plurality of functions used by the application.

In some embodiments, the executed portion of the application is the portion of the application that includes an initial rendering and executes prior to reaching a wait loop associated with waiting for user input.

At 1010, the method may further include monitoring which ones of the plurality of subsets has one or more of the at least one functions included therein invoked during execution of the portion of the application.

At 1012, the method may further include, for each of the ones of the plurality of subsets that has one or more of the at least one functions included therein invoked during execution of the portion of the application, setting the associated execution state flag.

Figure 12A:
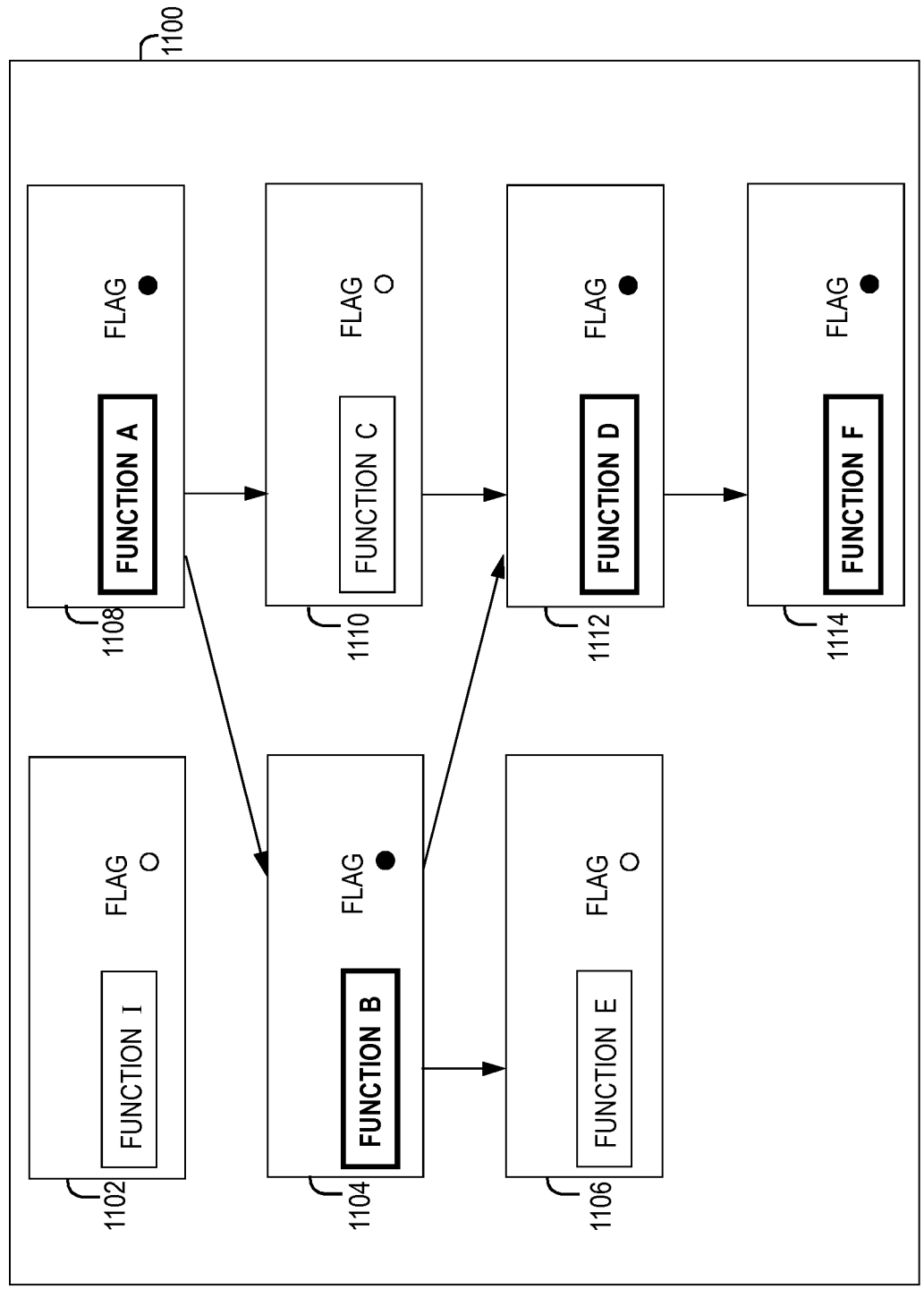
FIG. 12A is a representation of a portion of a ghost resource file, in accordance with some embodiments.

FIG. 12A is a representation of a portion of a ghost resource file 1100, after setting ones of the execution state flags to indicate ones of the plurality of subsets that had one or more of the at least one functions included therein invoked during execution of the portion of the application that includes the rendering portion, in accordance with some embodiments.

In accordance with some embodiments, the values (sometimes referred to herein as execution state values) of the execution state flags for the plurality of subsets within the ghost resource file may be viewed as defining a report, sometimes referred to herein as a coverage report.

Thus, in accordance with some embodiments, executing a portion of the application using the ghost resource file as the source of the code implementing the plurality of functions required by the application results in the generation of information (e.g., a "coverage report" including execution state values for execution state flags) indicating which ones of the plurality of subsets had one or more of the at least one functions included therein invoked during the execution of the portion of the application that includes the rendering portion.

In accordance with some embodiments, the information (e.g., the coverage report) may be parsed and used (in association with the master resource file) in generating the first set of one or more files generated at 514 of the method 500 (FIGS. 5A-5B) and in generating the second set of one or more files generated at 516 of the method 500 (FIGS. 5A-5B) and shown in FIGS. 9A-9B.

In some embodiments in which the first set of one or more files comprises more than one file, functions that are invoked sooner in a rendering may be considered of higher priority and thus may be included in one of the one or more files that may expected to be downloaded sooner than one or more other files of the first set of one or more files. Functions that are invoked later in a rendering may be considered of lesser priority and thus may be included in one of the one or more files that may be expected to be downloaded later than one or more other files of the first set of one or more files.

Different browsers may have, by default, a different number of available threads that can be utilized in order to concurrently download resources and/or perform other tasks. In some embodiments, in order to facilitate the first set of one or more files being downloaded in optimal time, a request (which in some embodiments will be the first request) received by the server is used to identify the requesting browser (by using a user-agent header that is included in the request and identifies the browser). Thus, the method may further include determining the number of available threads (which depends on the browser). According to this number, the first set of one or more files may be partitioned into a greater number of files, allowing them to be concurrently downloaded. In some embodiments, this will result in the first set of one or more files (which as a result of partitioning includes the greater number of files) being downloaded within a shorter time period by fully utilizing all available threads.

In some embodiments, the server will include multiple first sets of one or more files, each tailored to a particular browser, thus allowing the server to cater to different browsers in a manner which is tailored to help achieve the best performance for any specific browser.

Figure 12B:
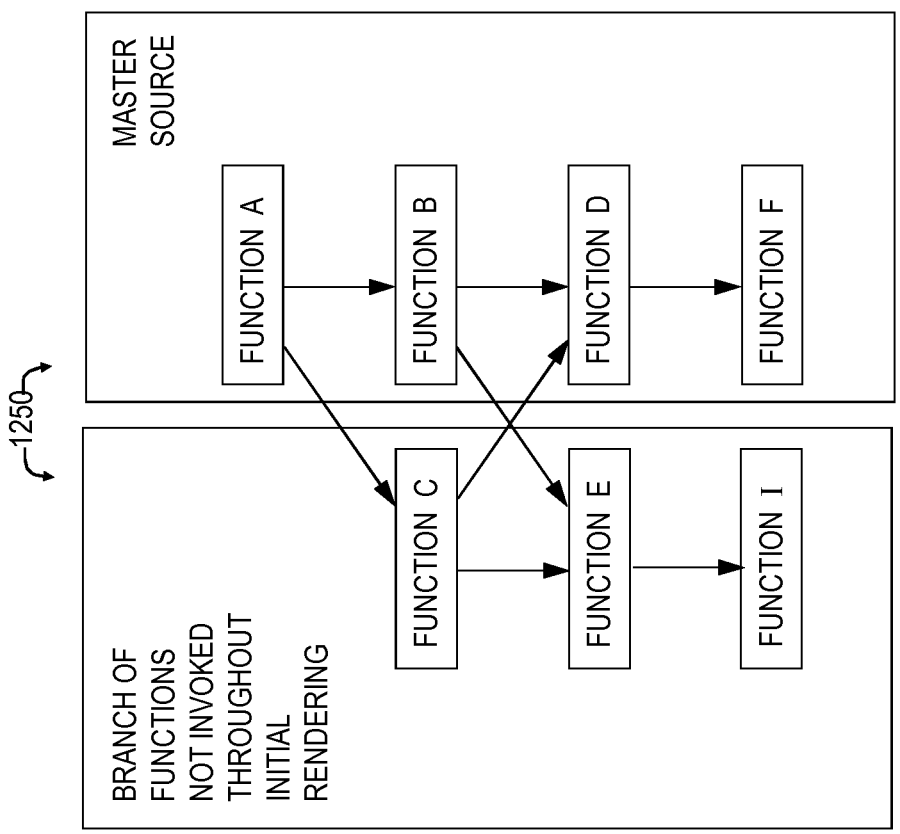
FIG. 12B is a representation of an extraction of an entire branch, in accordance with some embodiments.

In accordance with some embodiments, in the event that an entire branch of functions (in which one function invokes another, that invokes another . . . ) are not invoked throughout the initial rendering of a web site or other application, as opposed to extracting, to the second set of one or more files, each of the functions along the branch individually, the entire branch of functions along with their relevant variables may be wrapped within a parent container function, allowing the entire branch to be extracted in a single step. FIG. 12B is a representation 1250 of an extraction of an entire branch in a single step, in accordance with some embodiments.

Figure 13:
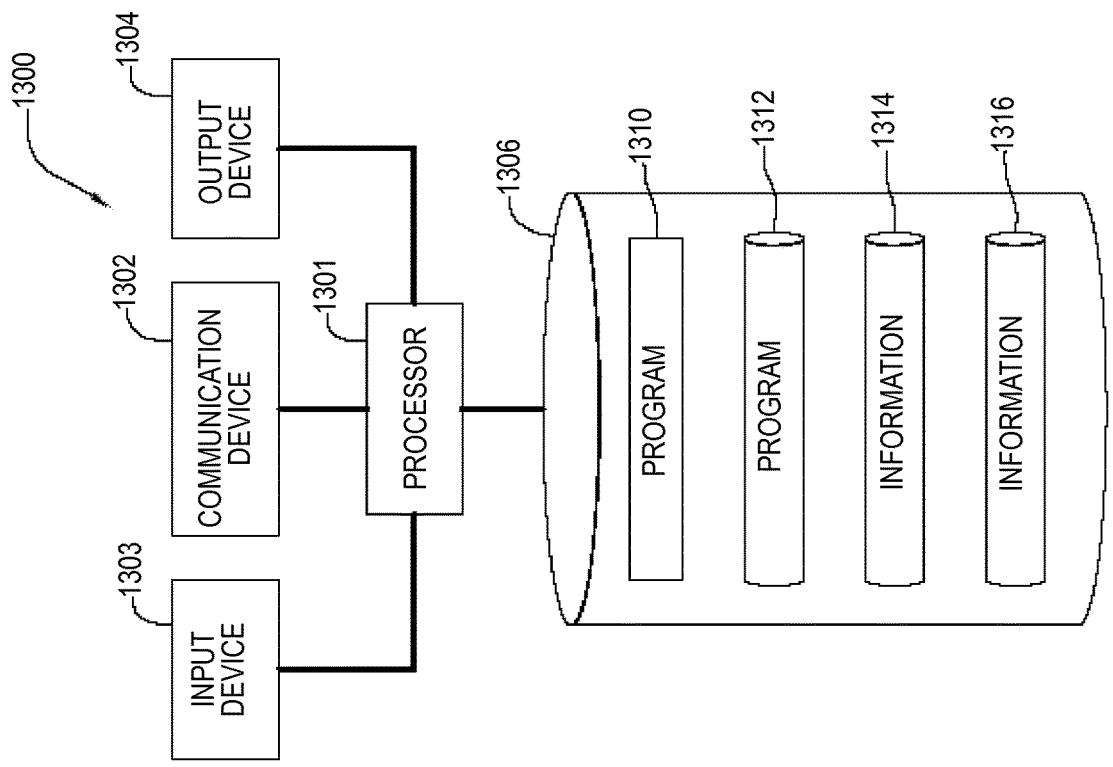
FIG. 13 is a block diagram of an architecture, in accordance with some embodiments.

FIG. 13 is a block diagram of an architecture 1300 according to some embodiments. In some embodiments, one or more of the systems and/or devices (and/or portion(s) thereof) disclosed herein may have an architecture that is the same as and/or similar to one or more portions of the architecture 1300.

In some embodiments, one or more of the methods (or portion(s) thereof) disclosed herein may be performed by a system, apparatus and/or device having an architecture that is the same as or similar to the architecture 1300 (or portion(s) thereof).

The architecture may be implemented as a distributed architecture or a non-distributed architecture. A distributed architecture may be a completely distributed architecture or a partly distributed-partly non distributed architecture.

Referring to FIG. 13, in accordance with some embodiments, the architecture 1300 includes a processor 1301 operatively coupled to a communication device 1302, an input device 1303, an output device 1304 and a storage device 1306, each of which may be distributed or non-distributed.

In some embodiments, the processor 1301 may execute processor-executable program code to provide one or more portions of the one or more disclosed herein and/or to carry out one or more portions of one or more embodiments of one or more methods disclosed herein. In some embodiments, the processor 1301 may be a conventional microprocessor or microprocessors.

The communication device 1302 may be used to facilitate communication with other devices and/or systems. In some embodiments, communication device 1302 may be configured with hardware suitable to physically interface with one or more external devices and/or network connections. For example, communication device 1302 may comprise an Ethernet connection to a local area network through which architecture 1300 may receive and transmit information over the Internet and/or one or more other network(s).

The input device 1303 may comprise, for example, one or more devices used to input data and/or other information, such as, for example: a keyboard, a keypad, track ball, touchpad, a mouse or other pointing device, a microphone, knob or a switch, an infra-red (IR) port, etc. The output device 1304 may comprise, for example, one or more devices used to output data and/or other information, such as, for example: an IR port, a display, a speaker, and/or a printer, etc.

The storage device 1306 may comprise, for example, one or more storage devices, such as, for example, magnetic storage devices (e.g., magnetic tape and hard disk drives), optical storage devices, and/or semiconductor memory devices such as Random Access Memory (RAM) devices and Read Only Memory (ROM) devices.

The storage device 1306 may store one or more programs 1310-1312 and/or other information for operation of the architecture 1300. In some embodiments, the one or more programs 1310-1312 include one or more instructions to be executed by the processor 1301 to provide one or more portions of one or more tasks and/or one or more portions of one or more methods disclosed herein. In some embodiments, the one or more programs 1310-1312 include one or more operating systems, database management systems, other applications, other information files, etc., for operation of the architecture 1300.

The storage device 1306 may store one or more databases and/or other information 1314-1316 for one or more programs. As used herein a "database" may refer to one or more related or unrelated databases. Data and/or other information may be stored in any form. In some embodiments, data and/or other information may be stored in raw, excerpted, summarized and/or analyzed form.

In some embodiments, one or more portions of one or more embodiments disclosed herein may be embodied in a method, an apparatus, a system, a computer program product, and/or an article where the computer program product and/or the article includes a machine readable storage medium with instructions stored thereon. As used herein, a machine may be any type of machine. In some embodiments, a machine comprises a processor. In some embodiments, a machine comprises a computer.

Unless stated otherwise, a function may have any form, for example, but not limited to, a function, a procedure, a module, a subroutine, and/or any other suitable code or structure.

Unless stated otherwise a function may invoked in any manner, for example, but not limited to, by a call (explicit or implicit) to the function, by a branch or jump to the function, and/or in any other suitable manner.

As used herein, "code" may include, but is not limited to, instructions in a high level language, low level language, machine language and/or other type of language or combination thereof.

As used herein, a program may comprise machine readable instructions in any type of language.

As used herein, an application may comprise any type of program.

The term "computer" should be understood to include one computer or two or more cooperating computers. Similarly, the term "processor" should be understood to include one processor or two or more cooperating processors. The term "memory" should be understood to encompass a single memory or storage device or two or more memories or storage devices.

Unless stated otherwise, a processor may comprise any type of processor. For example, a processor may be programmable or non-programmable, general purpose or special purpose, dedicated or non-dedicated, distributed or non-distributed, shared or not shared, and/or any combination thereof. A processor may include, but is not limited to, hardware, software, firmware, and/or any combination thereof. Hardware may include, but is not limited to off the shelf integrated circuits, custom integrated circuits and/or any combination thereof. In some embodiments, a processor comprises a microprocessor. Software may include, but is not limited to, instructions that are storable and/or stored on a computer readable medium, such as, for example, magnetic or optical disk, magnetic or optical tape, CD-ROM, DVD, RAM, EPROM, ROM or other semiconductor memory. A processor may employ continuous signals, periodically sampled signals, and/or any combination thereof. If a processor is distributed, two or more portions of the control/storage circuitry may communicate with one another through a communication link.

As used herein, a processing device is any type of device that includes a processor.

As used herein, a processing system is any type of system that includes a processor.

As used herein, a signal may be any type of signal, i.e., a physical quantity (e.g., voltage, current, or magnetic field), an indication, a message and/or any other type of signal or combination thereof.

Unless otherwise stated, terms such as, for example, "in response to" and "based on" mean "in response at least to" and "based at least on", respectively, so as not to preclude being responsive to and/or based on, more than one thing.

In addition, unless stated otherwise, terms such as, for example, "comprises", "has", "includes", and all forms thereof, are considered open-ended, so as not to preclude additional elements and/or features. In addition, unless stated otherwise, terms such as, for example, "a", "one", "first", are considered open-ended, and do not mean "only a", "only one" and "only a first", respectively. Moreover, unless stated otherwise, the term "first" does not, by itself, require that there also be a "second".

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A method implemented by a processing system in response to execution of code by a processor of the processing system, the method comprising:

receiving, via a network, an application that includes a rendering portion;

receiving, via a network, code implementing a plurality of functions used by the application;

defining, using the processor, a plurality of subsets of the plurality of functions, each of the plurality of subsets including at least one of the plurality of functions;

monitoring which ones of the plurality of subsets has one or more of the at least one functions included therein invoked by the application during execution of a portion of the application that includes the rendering portion;

generating information indicating which ones of the plurality of subsets had one or more of the at least one functions included therein invoked by the application during the execution of the portion of the application that includes the rendering portion;

generating information identifying any of the plurality of functions that depends on or is depended upon by one or more of the ones of the plurality of subsets that had one or more of the at least one functions included therein invoked by the application during execution of the portion of the application that includes the rendering portion;

generating, based at least in part on: (a) the information indicating which ones of the plurality of subsets had one or more of the at least one functions included therein invoked by the application during the execution of the portion of the application that includes the rendering portion and (b) the information identifying any of the plurality of functions that depends on or is depended upon by one or more of the ones of the plurality of subsets that had one or more of the at least one functions included therein invoked by the application during execution of the portion of the application that includes the rendering portion, a first set of one or more files that includes: (i) code implementing ones of the plurality of functions that are included in or more of the plurality of subsets that had one or more of the at least one functions included therein invoked by the application during execution of the portion of the application that includes the rendering portion, and (ii) code implementing any of the plurality of functions that depends on or is depended upon by one or more of the ones of the plurality of subsets that had one or more of the at least one functions included therein invoked by the application during execution of the portion of the application that includes the rendering portion;

generating a second set of one or more files that includes code implementing ones of the plurality of functions for which implementation code is not included in the first set of one or more files;

transmitting the first set of one or more files to a remote device via a network; and transmitting the second set of one or more files to the remote device via the network after the transmitting the first set of one or more files to the remote device via the network.

2. The method of claim 1, further comprising:

after the generating of the first set of one or more files, receiving a request for the first set of one or more files from a remote device via a network.

3. The method of claim 1, wherein the first set of one or more files includes a plurality of files.

4. The method of claim 1, wherein the generating the first set of one or more files comprises:

generating the first set of one or more files after the generating information indicating which ones of the plurality of subsets had one or more of the at least one functions included therein invoked during the execution of the portion of the application that includes the rendering portion.

5. The method of claim 1, further comprising:
generating a file comprising a plurality of containers, each of the plurality of containers being associated with a respective one of the plurality of subsets and comprising: (i) code implementing the at least one of the plurality of functions that are included in the respective one of the plurality of subsets, and (ii) a flag that is associated with the respective one of the plurality of subsets and indicating whether the respective one of the plurality of subsets had one or more of the at least one functions included therein invoked during execution of the portion of the application that includes the rendering portion.

6. The method of claim 1, wherein the generating, based at least in part on: (a) the information indicating which ones of the plurality of subsets had one or more of the at least one functions included therein invoked during the execution of the portion of the application that includes the rendering portion and (b) the information identifying any of the plurality of functions that depends on or is depended upon by one or more of the ones of the plurality of subsets that had one or more of the at least one functions included therein invoked during execution of the portion of the application that includes the rendering portion, a first set of one or more files that includes: (i) code implementing ones of the plurality of functions that are included in or more of the plurality of subsets that had one or more of the at least one functions included therein invoked during execution of the portion of the application that includes the rendering portion, and (ii) code implementing any of the plurality of functions that depends on or is depended upon by one or more of the ones of the plurality of subsets that had one or more of the at least one functions included therein invoked during execution of the portion of the application that includes the rendering portion, comprises:
generating, based at least in part on: (a) the information indicating which ones of the plurality of subsets had one or more of the at least one functions included therein invoked during the execution of the portion of the application that includes the rendering portion and (b) the information identifying any of the plurality of functions that depends on or is depended upon by one or more of the ones of the plurality of subsets that had one or more of the at least one functions included therein invoked during execution of the portion of the application that includes the rendering portion, a first set of one or more files that includes: (i) code implementing ones of the plurality of functions that are included in or more of the plurality of subsets that had one or more of the at least one functions included therein invoked during execution of the portion of the application that includes the rendering portion, and (ii) code implementing any of the plurality of functions that depends on or is depended upon by one or more of the ones of the plurality of subsets that had one or more of the at least one functions included therein invoked during execution of the portion of the application that includes the rendering portion, and (iii) a plurality of stubs, each invoking an external code loader and being associated with a respective one of the ones of the plurality of functions for which implementation code is not included in the first set of one or more files.

7. A non-transitory computer readable storage medium having code stored thereon, the code being executable by a processor to result in a method comprising:
receiving, via a network, an application that includes a rendering portion;
receiving, via a network, code implementing a plurality of functions used by the application;
defining, using the processor, a plurality of subsets of the plurality of functions, each of the plurality of subsets including at least one of the plurality of functions;
monitoring which ones of the plurality of subsets has one or more of the at least one functions included therein invoked by the application during execution of a portion of the application that includes the rendering portion;
generating information indicating which ones of the plurality of subsets had one or more of the at least one functions included therein invoked by the application during the execution of the portion of the application that includes the rendering portion;
generating information identifying any of the plurality of functions that depends on or is depended upon by one or more of the ones of the plurality of subsets that had one or more of the at least one functions included therein invoked by the application during execution of the portion of the application that includes the rendering portion;
generating, based at least in part on: (a) the information indicating which ones of the plurality of subsets had one or more of the at least one functions included therein invoked by the application during the execution of the portion of the application that includes the rendering portion and (b) the information identifying any of the plurality of functions that depends on or is depended upon by one or more of the ones of the plurality of subsets that had one or more of the at least one functions included therein invoked by the application during execution of the portion of the application that includes the rendering portion, a first set of one or more files that includes: (i) code implementing ones of the plurality of functions that are included in or more of the plurality of subsets that had one or more of the at least one functions included therein invoked by the application during execution of the portion of the application that includes the rendering portion, and (ii) code implementing any of the plurality of functions that depends on or is depended upon by one or more of the ones of the plurality of subsets that had one or more of the at least one functions included therein invoked by the application during execution of the portion of the application that includes the rendering portion;
generating a second set of one or more files that includes code implementing ones of the plurality of functions for which implementation code is not included in the first set of one or more files;
transmitting the first set of one or more files to a remote device via a network; and
transmitting the second set of one or more files to the remote device via the network after the transmitting the first set of one or more files to the remote device via the network.

8. The non-transitory computer readable medium of claim 7, the method further comprising:

after the generating of the first set of one or more files, receiving a request for the first set of one or more files from a remote device via a network.

9. The non-transitory computer readable medium of claim 7, wherein the first set of one or more files includes a plurality of files.

10. The non-transitory computer readable medium of claim 7, wherein the generating the first set of one or more files comprises:
generating the first set of one or more files after the generating information indicating which ones of the plurality of subsets had one or more of the at least one functions included therein invoked during the execution of the portion of the application that includes the rendering portion.

11. The non-transitory computer readable medium of claim 7, the method further comprising:
generating a file comprising a plurality of containers, each of the plurality of containers being associated with a respective one of the plurality of subsets and comprising: (i) code implementing the at least one of the plurality of functions that are included in the respective one of the plurality of subsets, and (ii) a flag that is associated with the respective one of the plurality of subsets and indicating whether the respective one of the plurality of subsets had one or more of the at least one functions included therein invoked during execution of the portion of the application that includes the rendering portion.

12. The non-transitory computer readable medium of claim 7, wherein the generating, based at least in part on: (a) the information indicating which ones of the plurality of subsets had one or more of the at least one functions included therein invoked during the execution of the portion of the application that includes the rendering portion and (b) the information identifying any of the plurality of functions that depends on or is depended upon by one or more of the ones of the plurality of subsets that had one or more of the at least one functions included therein invoked during execution of the portion of the application that includes the rendering portion, a first set of one or more files that includes: (i) code implementing ones of the plurality of functions that are included in or more of the plurality of subsets that had one or more of the at least one functions included therein invoked during execution of the portion of the application that includes the rendering portion, and (ii) code implementing any of the plurality of functions that depends on or is depended upon by one or more of the ones of the plurality of subsets that had one or more of the at least one functions included therein invoked during execution of the portion of the application that includes the rendering portion, comprises:
generating, based at least in part on: (a) the information indicating which ones of the plurality of subsets had one or more of the at least one functions included therein invoked during the execution of the portion of the application that includes the rendering portion and (b) the information identifying any of the plurality of functions that depends on or is depended upon by one or more of the ones of the plurality of subsets that had one or more of the at least one functions included therein invoked during execution of the portion of the application that includes the rendering portion, a first set of one or more files that includes: (i) code implementing ones of the plurality of functions that are included in or more of the plurality of subsets that had one or more of the at least one functions included therein invoked during execution of the portion of the application that includes the rendering portion, and (ii) code implementing any of the plurality of functions that depends on or is depended upon by one or more of the ones of the plurality of subsets that had one or more of the at least one functions included therein invoked during execution of the portion of the application that includes the rendering portion, and (iii) a plurality of stubs, each invoking an external code loader and being associated with a respective one of the ones of the plurality of functions for which implementation code is not included in the first set of one or more files.

13. A system comprising:
a memory storing processor-executable code; and
a processor to execute processor-executable code in order to cause the system to:
receive, via a network, an application that includes a rendering portion;
receive, via a network, code implementing a plurality of functions used by the application;
define, using the processor, a plurality of subsets of the plurality of functions, each of the plurality of subsets including at least one of the plurality of functions;
monitor which ones of the plurality of subsets has one or more of the at least one functions included therein invoked by the application during execution of a portion of the application that includes the rendering portion;
generate information indicating which ones of the plurality of subsets had one or more of the at least one functions included therein invoked by the application during the execution of the portion of the application that includes the rendering portion;
generate information identifying any of the plurality of functions that depends on or is depended upon by one or more of the ones of the plurality of subsets that had one or more of the at least one functions included therein invoked by the application during execution of the portion of the application that includes the rendering portion;
generate, based at least in part on: (a) the information indicating which ones of the plurality of subsets had one or more of the at least one functions included therein invoked by the application during the execution of the portion of the application that includes the rendering portion and (b) the information identifying any of the plurality of functions that depends on or is depended upon by one or more of the ones of the plurality of subsets that had one or more of the at least one functions included therein invoked by the application during execution of the portion of the application that includes the rendering portion, a first set of one or more files that includes: (i) code implementing ones of the plurality of functions that are included in or more of the plurality of subsets that had one or more of the at least one functions included therein invoked by the application during execution of the portion of the application that includes the rendering portion, and (ii) code implementing any of the plurality of functions that depends on or is depended upon by one or more of the ones of the plurality of subsets that had one or more of the at least one functions included therein invoked by the application during execution of the portion of the application that includes the rendering portion;
generate a second set of one or more files that includes code implementing ones of the plurality of functions for which implementation code is not included in the first set of one or more files;

transmit the first set of one or more files to a remote device via a network; and transmit the second set of one or more files to the remote device via the network after the transmitting the first set of one or more files to the remote device via the network.

14. The system of claim 13, wherein the processor is further to execute processor-executable code in order to cause the system to:

receive, after generation of the first set of one or more files, a request for the first set of one or more files from a remote device via a network.

15. The system of claim 13, wherein the first set of one or more files includes a plurality of files.

16. The system of claim 13, wherein generation of the first set of one or more files comprises:

generation of the first set of one or more files after the generating information indicating which ones of the plurality of subsets had one or more of the at least one functions included therein invoked during the execution of the portion of the application that includes the rendering portion.

17. The system of claim 13, wherein the processor is further to execute processor-executable code in order to cause the system to:

generate a file comprising a plurality of containers, each of the plurality of containers being associated with a respective one of the plurality of subsets and comprising: (i) code implementing the at least one of the plurality of functions that are included in the respective one of the plurality of subsets, and (ii) a flag that is associated with the respective one of the plurality of subsets and indicating whether the respective one of the plurality of subsets had one or more of the at least one functions included therein invoked during execution of the portion of the application that includes the rendering portion.

* * * * *